US010277943B2

(12) United States Patent
Crisler et al.

(10) Patent No.: US 10,277,943 B2
(45) Date of Patent: Apr. 30, 2019

(54) SELECTIVE RENDERING OF SPARSE PERIPHERAL DISPLAYS BASED ON USER MOVEMENTS

(71) Applicant: MICROSOFT TECHNOLOGY LICENSING, LLC, Redmond, WA (US)

(72) Inventors: Matthew Calbraith Crisler, Redmond, WA (US); Robert Thomas Held, Seattle, WA (US); Eliezer Glik, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 115 days.

(21) Appl. No.: 15/470,806

(22) Filed: Mar. 27, 2017

(65) Prior Publication Data

US 2018/0278993 A1    Sep. 27, 2018

(51) Int. Cl.
*G02B 27/01* (2006.01)
*H04N 21/442* (2011.01)
(Continued)

(52) U.S. Cl.
CPC ... *H04N 21/44218* (2013.01); *G02B 27/0093* (2013.01); *G02B 27/01* (2013.01); *G06F 3/012* (2013.01); *G06F 3/013* (2013.01); *G06F 3/017* (2013.01); *G06K 9/00335* (2013.01); *G06K 9/00892* (2013.01); *G02B 27/017* (2013.01);
(Continued)

(58) Field of Classification Search
CPC ..... G02B 27/0093; G02B 27/01; G06F 3/012; G06F 3/013; G06F 3/017; G06K 9/00335; G06K 9/00892; H04N 21/44218
See application file for complete search history.

(56) References Cited

U.S. PATENT DOCUMENTS 5,689,287 A    11/1997   Mackinlay et al.
6,014,117 A    1/2000    Hennessy et al.
(Continued)

FOREIGN PATENT DOCUMENTS

WO    2014199155 A1    12/2014
WO    2016168047 A1    10/2016

OTHER PUBLICATIONS

U.S. Appl. No. 15/470,773, filed Mar. 27, 2017, Crisler et al.
(Continued)

*Primary Examiner* — Carolyn R Edwards
(74) *Attorney, Agent, or Firm* — Workkman Nydegger

(57) ABSTRACT

Peripheral visualizations are based on user movements and/or interactions with elements in a scene. Various user movements are detected while a scene is being rendered. Afterwards, the embodiments determine whether one of the movements corresponds with an increase in a level of focus by the user to the one or more elements and/or an interaction by the user with the one or more elements. Thereafter, peripheral visualizations are rendered on one or more peripheral displays proximate elements that correspond with the user movements/interactions/focus. In some instances, the selective rendering is performed in response to a determination that the user movement does correspond with the increase in the level of focus by the user to the one or more elements and/or the interaction by the user with the one or more elements.

20 Claims, 13 Drawing Sheets

(51) Int. Cl.
  *G02B 27/00* (2006.01)
  *G06F 3/01* (2006.01)
  *G06K 9/00* (2006.01)
  *G06F 3/0482* (2013.01)
(52) U.S. Cl.
  CPC .... *G02B 2027/0187* (2013.01); *G06F 3/0482* (2013.01)

(56) References Cited

U.S. PATENT DOCUMENTS

| | | | |
|---|---|---|---|
| 6,252,989 | B1 | 6/2001 | Geisler et al. |
| 8,225,224 | B1 | 7/2012 | Robertson et al. |
| 8,533,615 | B1 | 9/2013 | Sams |
| 9,123,179 | B2 | 9/2015 | Toyoda et al. |
| 9,588,593 | B2 | 3/2017 | Li |
| 9,606,362 | B2 | 3/2017 | Passmore et al. |
| 9,607,428 | B2 * | 3/2017 | Li ............... G02B 27/017 |
| 9,766,463 | B2 | 9/2017 | Border et al. |
| 2004/0227703 | A1 | 11/2004 | Lamvik et al. |
| 2009/0309811 | A1 | 12/2009 | Hinton |
| 2010/0253594 | A1 | 10/2010 | Szczerba et al. |
| 2013/0158963 | A1 | 6/2013 | Brooks et al. |
| 2013/0314441 | A1 | 11/2013 | Grasset et al. |
| 2014/0002629 | A1 | 1/2014 | Ratcliff et al. |
| 2014/0091989 | A1 | 4/2014 | Szczerba et al. |
| 2014/0146394 | A1 | 5/2014 | Tout et al. |
| 2015/0094142 | A1 * | 4/2015 | Stafford ............. G06F 3/04815 463/31 |
| 2015/0215412 | A1 | 7/2015 | Marvit et al. |
| 2015/0243099 | A1 | 8/2015 | Schowengerdt |
| 2015/0262428 | A1 | 9/2015 | Tatzgern et al. |
| 2015/0287158 | A1 | 10/2015 | Cerny et al. |
| 2015/0339589 | A1 * | 11/2015 | Fisher ................ G06N 99/005 706/12 |
| 2016/0001078 | A1 | 1/2016 | Greenberg et al. |
| 2016/0027264 | A1 | 1/2016 | Choi et al. |
| 2016/0171779 | A1 | 6/2016 | Bar-zeev et al. |
| 2016/0306431 | A1 * | 10/2016 | Stafford .................. G06F 3/014 |
| 2017/0003750 | A1 * | 1/2017 | Li ............................ G06F 3/017 |
| 2017/0287112 | A1 * | 10/2017 | Stafford .................... G06T 5/00 |
| 2018/0012333 | A1 * | 1/2018 | Urban .................. G06T 3/4038 |

OTHER PUBLICATIONS

Xiao, et al., "Augmenting the Field-of-View of Head-Mounted Displays with Sparse Peripheral Displays", In Proceedings of the CHI Conference on Human Factors in Computing Systems, May 7, 2016, pp. 1221-1232.
"Non Final Office Action Issued in U.S. Appl. No. 15/470,773", dated Jun. 7, 2018, 16 Pages.
Kelleher, et al., "Visual Salience and Reference Resolution in Simulated 3-D Environments", In Artificial Intelligence Review, vol. 21, Jan. 1, 2004, pp. 253-267.
"International Search Report and Written Opinion Issued in PCT Application No. PCT/US2018/023211", dated Jun. 11, 2018, 11 Pages.
"International Search Report and Written Opinion Issued in PCT Application No. PCT/US2018/023214", dated Jun. 15, 2018, 13 Pages.
Perazzi, et at, "Saliency Filters: Contrast Based Filtering for Salient Region Detection", In Proceedings of the IEEE Conference on Computer Vision and Pattern Recognition, Jun. 1, 2012, pp. 733-740.

* cited by examiner

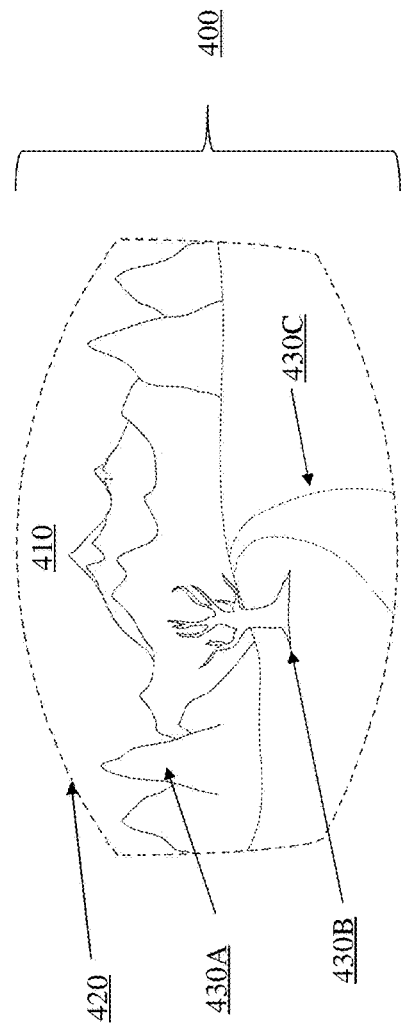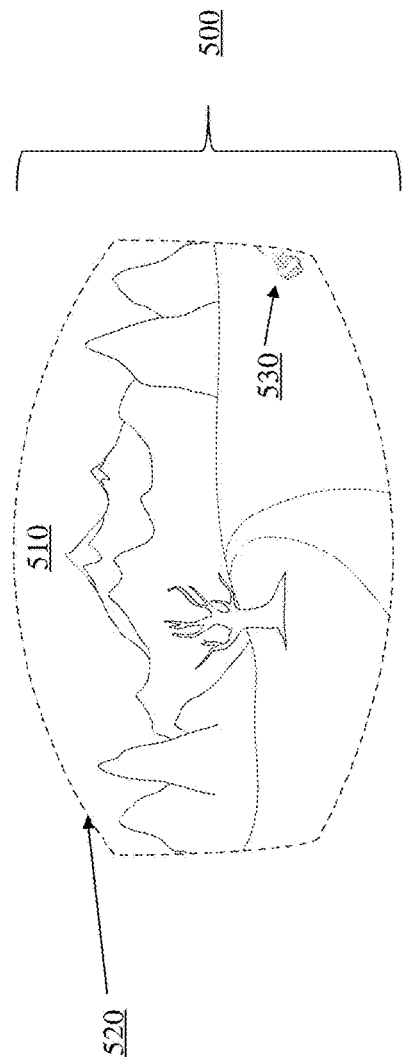

SELECTIVE RENDERING OF SPARSE PERIPHERAL DISPLAYS BASED ON USER MOVEMENTS

CROSS-REFERENCE TO RELATED APPLICATIONS

Not Applicable.

BACKGROUND OF THE INVENTION

Computers and computing systems have impacted nearly every aspect of modern living. For example, computers are generally involved in work, recreation, healthcare, transportation, entertainment, household management, etc.

Mixed-reality computer systems, which include virtual-reality systems and augmented-reality systems, have recently received significant interest for their ability to create immersive experiences for users. Conventional augmented-reality systems create an augmented-reality scenario by visually presenting virtual objects in the real world. In contrast, conventional virtual-reality systems create a more immersive experience because a user's entire view is obstructed by a virtual world. As used herein, mixed-reality, augmented-reality, and virtual-reality systems are described and referenced interchangeably. Unless specifically stated or unless specifically required, as understood by one of skill in the art, the descriptions herein apply equally to any type of mixed-reality system, including augmented-reality systems, virtual-reality systems, and/or any other similar system capable of displaying virtual objects to a user.

Mixed-reality computer systems use one or more on-body devices (e.g., a head-mounted device, a handheld device, etc.). A head-mounted device provides a display, sometimes referred to as a head-mounted display (hereinafter "HMD"), that enables a user to view overlapping and/or integrated visual information in the user's ambient environment (i.e. the user's field of view). By way of example, a mixed-reality computer system may present visual information in the form of a simulated object on an actual table surface.

Continued advances in hardware capabilities and rendering technologies have greatly increased the realism of virtual objects displayed to a user within a mixed-reality environment. For example, in mixed-reality environments, virtual objects can be placed within the real world in such a way as to give the impression that the virtual object is part of the real world. As a user moves around within the real world, the mixed-reality environment automatically updates so that the user is provided with the proper perspective and view of the virtual object. This mixed-reality environment is often referred to as a computer-generated scene, or simply a "scene."

Although HMDs provide a versatile interface, modern-day HMDs are limited in the amount of "field of view" that is presented to a user. To clarify, HMDs have a limited amount of realty (i.e. space) in which a scene may be displayed. Because of this constraint, the user's virtual experience is limited to only the region displayed on the HMD. For areas outside of that viewable region, a user sees either no virtual content (e.g., in an augmented-reality situation) or complete darkness (e.g., in a virtual-reality situation). It is commonly known that some users, when immersed in such an environment, can feel discomfort.

In an effort to combat these problems, mixed-reality system designers have introduced the use of a "sparse peripheral display." As suggested by its name, a sparse peripheral display is a low-resolution display that is situated around an outer perimeter of a main display. As used herein, "sparse peripheral display" and "peripheral display" are described and referenced interchangeably. This sparse peripheral display is comprised of an array of low resolution "pixels" that provide only a generalized context for the scene. Notably, a pixel refers to any light-emitting source (e.g., a light emitting diode "LED").

As alluded to in the above passages, immersing a user into a mixed-reality environment (i.e. a scene) creates many challenges and difficulties that extend beyond the mere presentation of that mixed-reality environment to the user. As suggested above, some mixed-reality computer systems utilize sparse peripheral displays. However, conventional mixed-reality computer systems are somewhat limited in their ability to process the data required to display detailed peripheral visual content. As a result, these displays place unnecessary burdens on the computer system's operations. Accordingly, there exists a strong need in the field to improve the manner in which sparse peripheral displays are used.

The subject matter claimed herein is not limited to embodiments that solve any disadvantages or that operate only in environments such as those described above. Rather, this background is provided to illustrate only one exemplary technology area where some embodiments described herein may be practiced.

BRIEF SUMMARY OF THE INVENTION

Disclosed embodiments presented herein relate to systems, hardware storage devices, and methods for selectively rendering a peripheral visualization based at least in part on a detected movement of a user of the computer system. Initially, a scene is rendered on a primary display. The scene includes one or more elements. Then, upon detecting various user movements while the scene is being rendered, a determination is made whether at least one of the user movements corresponds with 1) an increase in a level of focus by the user to the one or more elements or 2) an interaction by the user with the one or more elements. Thereafter, the embodiments selectively render the peripheral visualization on one or more peripheral displays. This selective rendering is performed in response to a determination that the user movement does correspond with 1) the increase in the level of focus by the user to the one or more elements and/or 2) the interaction by the user with the one or more elements.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which:

FIG. 4 illustrates a realistic scene that can be rendered by a HMD.

FIG. 5 illustrates an element that is located at an edge region of a primary display's limited field of view.

DETAILED DESCRIPTION OF THE INVENTION

Figure 1:
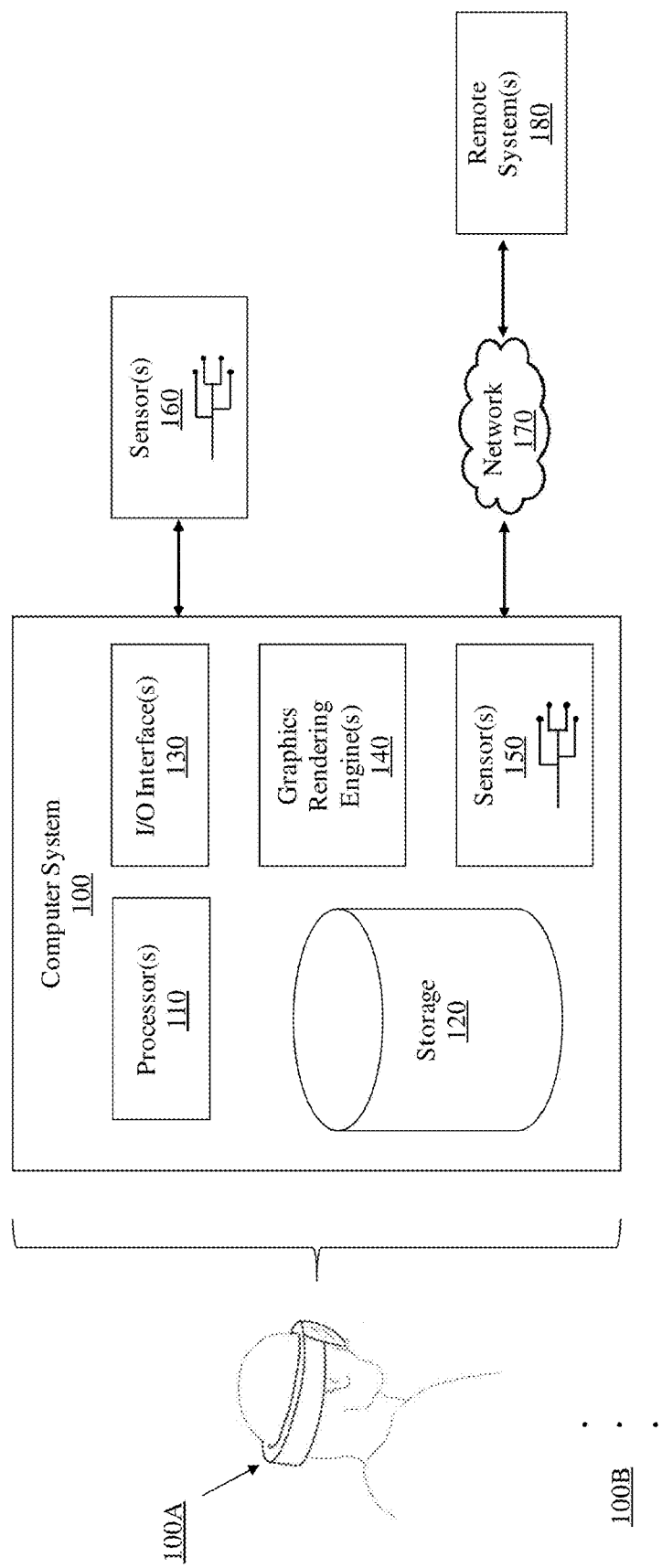
FIG. 1 illustrates an abstract view of a computer system.

Disclosed embodiments include systems, hardware storage devices, and methods for selectively rendering a peripheral visualization based at least in part on a detected movement of a user of the computer system. Initially, a scene is generated with one or more elements. The scene is rendered on a primary display and a peripheral display is selectively rendered with the scene based on detected user movements.

While the scene is being rendered, various user movements are detected and a determination is made whether at least one of the user movements corresponds with 1) an increase in a level of focus by the user to the one or more elements and/or 2) an interaction by the user with the one or more elements. Thereafter, the peripheral visualization is rendered on one or more peripheral displays based on the determination. Accordingly, the rendering is selectively performed in direct response to a determination that the user movement does correspond with 1) the increase in the level of focus by the user to the one or more elements and/or 2) the interaction by the user with the one or more elements.

The following disclosure will now include a further description of some of the problems prevalent in the current technology. Then, the disclosure will use FIG. 1 to present some introductory discussion of a computing system. Following that discussion, the disclosure will use FIG. 2 to present subject matter focused on an exemplary computer system that selectively renders a peripheral visualization based on various attributes associated with a computer-generated scene. FIGS. 3-12 will then be discussed. These figures present various attributes and characteristics related to the "smart" use of a peripheral display. Lastly, additional supporting architectures and methods using the novel principles described herein will be detailed with respect to the subsequent figures.

As briefly introduced earlier, increasing a user's field of view in a mixed-reality environment presents multiple challenges. For instance, challenges arise when attempts are made to render a scene at "equal" resolution throughout the user's entire visual field. In such situations, developers must tackle power, thermal, optics, and HMD weight complexities.

Here, it is worthwhile to note that human vision does not necessarily require equal resolution across an entire scene. In light of this fact, emphasis has been placed on HMDs that use progressive resolution displays. To illustrate, these types of HMDs include 1) a high resolution primary display and 2) various lower resolution (e.g., sparse) peripheral displays. The lower resolution displays are positioned around an outer perimeter of the primary display, this positioning gives rise to use of the term "peripheral." These HMDs capitalize on the fact that the peripheral areas of a user's vision do not need to be displayed using high resolutions. As a result, these HMDs display high resolution content in a centrally forward looking region and display lower resolution content in the peripheral areas. Stated differently, these types of HMDs provide only "contextual" awareness of events or elements that are located at the peripheral regions of a primary display.

Progressive resolution HMDs are a valuable contribution to the mixed-reality technology. Indeed, there is great value in providing contextual awareness in regions where human visual resolution is still high (i.e. a user's peripheral vision) but where the rendered resolution is not high due to the reasons stated above. As a result, augmenting the "full resolution" primary display with a much sparser peripheral display provides this needed awareness.

In some instances, however, these progressive resolution HMDs can feel unnatural. Indeed, depending on how low of a resolution the peripheral displays provide, users may experience discomfort. Even further, these low resolution peripheral displays may unnecessarily occlude real-world visual objects in the user's periphery. Additionally, some types of peripheral displays impose unnecessary burdens on a computer system's battery.

To address these challenges, the present embodiments utilize a normally "off" (i.e. default) configuration for all pixels in the peripheral display. This default configuration reduces the unnatural, distracting, and occluding elements of the peripheral display and instead renders pixels that are determined to be particularly "salient" due to motion or other changing characteristics of the mixed-reality scene and/or based on user focus on elements in the virtual environment. The embodiments "turn on" one or more pixels of one or more peripheral displays in response to determining that a scene element is "salient." Further detail on these benefits will be provided later on in this disclosure. By "salient," it is meant that an element is distinguishable or otherwise unique in some manner. Further detail on the meaning of "saliency" will be provided later in this disclosure.

As described herein, the disclosed embodiments can be used to selectively control when peripheral displays are activated/utilized, which can reduce overall power consumption (e.g., as compared to continuous peripheral displays), and which can also improve the natural, comfortable feel of a mixed-reality environment.

As illustrated in FIG. 1, in its most basic configuration, a computer system 100 takes many different forms (e.g., a head mounted device 100A that includes a HMD). Although FIG. 1 illustrates the computer system 100 as a head mounted device 100A, the current embodiments are not limited solely to that which is illustrated in FIG. 1. As a result, the ellipses 100B demonstrates that any type of computing device is available for use by the present embodiments.

The computer system 100 typically includes at least one processing unit 110 and storage 120. The storage 120 may be physical system memory, which may be volatile, non-volatile, or some combination of the two. The term "memory" may also be used herein to refer to non-volatile mass storage such as physical storage media. If the computing system is distributed, the processing, memory, and/or storage capability may be distributed as well. As used herein, the term "executable module," "executable component," or even "component" can refer to software objects, routines, or methods that may be executed on the computing system. The different components, modules, engines, and services described herein may be implemented as objects or processors that execute on the computing system (e.g. as separate threads).

Disclosed embodiments include or utilize a special purpose or general-purpose computer including computer hardware, such as, for example, one or more processors (such as processor 110) and system memory (such as storage 120), as discussed in greater detail below. Embodiments within the scope of the present invention also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are physical computer storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM, solid state drives (SSDs) that are based on RAM, Flash memory, phase-change memory (PCM), or other types of memory, or other optical disk storage, magnetic disk storage or other magnetic storage devices, or any other medium which can be used to store desired program code means in the form of computer-executable instructions, data or data structures and which can be accessed by a general purpose or special purpose computer.

As shown in FIG. 1, the computer system 100 comprises various different components including I/O interface(s) 130, graphics rendering engine(s) 140, and one or more sensors 150. The computer system 100 may be connected (via a wired or wireless connection) to external sensors 160 (e.g., one or more remote cameras, accelerometers, gyroscopes, acoustic sensors, magnetometers, etc.). Further, the computer system 100 may also be connected through one or more wired or wireless networks 170 to remote systems(s) 180 that are configured to perform any of the processing described with regard to computer system 100.

During use, a user of the computer system 100 is able to perceive information (e.g., a computer-generated scene) through a display screen (e.g., a HMD) that is included within the I/O interface(s) 130. The I/O interface(s) 130 and sensors 150/160 also include gesture detection devices, eye trackers, and/or other movement detecting components (e.g., cameras, gyroscopes, accelerometers, magnetometers, acoustic sensors, global positioning systems, etc.) that are able to detect positioning and movement of one or more real-world objects, such as a user's hand, a stylus, and/or any other object(s) that the user may interact with while being immersed in the scene (i.e. a mixed-reality environment).

In some instances, the positioning and movement of the user and the objects are continuously monitored. This monitoring specifically detects any variation in the position and the movement of the objects, such as a detected change in position, velocity, orientation, or acceleration. These movements can be absolute movements and/or relative movements, such as compared to a relative positioning of the HMD (e.g., how a handheld device is oriented/positioned relative to the HMD), and such that movements/positioning of the HMD will be calculated into the relative movements/positioning of the objects as they are presented in the scene. Movements also include, in some instances, the movement of a user's eye towards a peripheral object or toward the edge of the primary display. The graphics rendering engine 140 is configured, with the processor(s) 110, to render one or more virtual objects within the computer-generated scene. This rendering includes hand occlusions, or other types of occlusions, that are mapped to the relative positions of real-world elements/objects (the terms "objects" and "elements" can be used interchangeably). Occlusion generally relates to a situation in which an element blocks the view of another element. For example, suppose a computer-generated scene includes a real-world table and a virtual lamp that is disposed on top of the real-world table. Because the virtual lamp is positioned on top of the real-world table, the virtual lamp will occlude a portion of the real-world table, even though the lamp is a virtual element and the table is a real element. Therefore, elements can occlude other elements in the scene, regardless of whether those elements are virtual or real. Continuing from the discussion above, occlusions are mapped to the relative positions of real-world elements, the virtual elements accurately move in response to movement of the real-world elements. The graphics rendering engine 140 is also configured to render one or more occlusions that are purely virtual (without being mapped to real-world objects) but which are, nonetheless, positioned and moved responsively to user input as the user interacts within the scene.

The graphics rendering engine(s) 140, which may include one or more GPUs, is configured to render the occlusions with certain display properties. These properties include coloring, transparency or opaqueness, texturing, edge definition (e.g., thickness and/or sharpness vs. blurring and/or feathering), size, and so forth. When certain movement thresholds are detected for the occlusion, then one or more combinations of the display properties for the occlusion will be modified (at least while the detected movement meets or exceeds the movement thresholds).

The movement thresholds can include any combination of the following: 1) detected actual movements of the real-world object associated with the occlusion, 2) detected animation movement of the virtualized occlusion, and/or 3) detected variance or lag between the real-world movement and the animated movement. The detected movements are associated with velocity and/or acceleration attribute values.

These values are detected, measured, and/or calculated by the sensors 150/160 and/or processors 110 of the computer system 100.

In some embodiments, the same absolute movement thresholds are associated with all types of movements. For instance, a certain velocity, acceleration, or lag associated with an occlusion will be sufficient to trigger a change in the display properties of the occlusion. This change may be triggered regardless of the specific type of detected movement. In other embodiments, different types of movements (i.e., different movements within the six degrees of freedom, including surge, heave, sway, pitch, roll, and yaw) are associated with different movement thresholds. For instance, a particular rotational acceleration will trigger a first threshold that is different than a lateral acceleration.

In some instances, there are at least two or more separate threshold limits for one or more of the different movement types. For instance, at a first acceleration metric, the first threshold is met. At a second acceleration metric, which is greater or less than the first acceleration metric, a second threshold is met. In some instances, one or more separate velocity thresholds are set for each of one or more types of movement. The appearance of the occlusion will dynamically change in response to each of the different thresholds being met, such as by changing the display attributes of the occlusion.

Some disclosed embodiments include gradually modifying the appearance of the occlusion correspondingly to different detected changes in the movement attribute(s) associated with the occlusion. In such embodiments, the display attributes/properties are continuously changed/scaled according to a continuously changing movement attribute (such that there are no discrete levels). For instance, the levels of transparency and/or edge feathering for an occlusion may be associated with many different corresponding magnitudes of velocity and/or acceleration associated with the occlusion (even when comprising movement of the real-world object) and/or lag associated with rendering an animation of the occlusion.

A "network," like the network 170 shown in FIG. 1, is defined as one or more data links and/or data switches that enable the transport of electronic data between computer systems, modules, and/or other electronic devices. When information is transferred, or provided, over a network (either hardwired, wireless, or a combination of hardwired and wireless) to a computer, the computer properly views the connection as a transmission medium. The computer system 100 will include one or more communication channels that are used to communicate with the network 170. Transmissions media include a network that can be used to carry data or desired program code means in the form of computer-executable instructions or in the form of data structures. Further, these computer-executable instructions are accessible by a general purpose or special purpose computer. Combinations of the above should also be included within the scope of computer-readable media.

Upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC") and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions that cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in networked computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems that are linked (either by hardwired data links, wireless data links, or by a combination of hardwired and wireless data links) through a network, each perform tasks (e.g. cloud computing, cloud services and the like). In a distributed system environment, program modules may be located in both local and remote memory storage devices.

Figure 2:
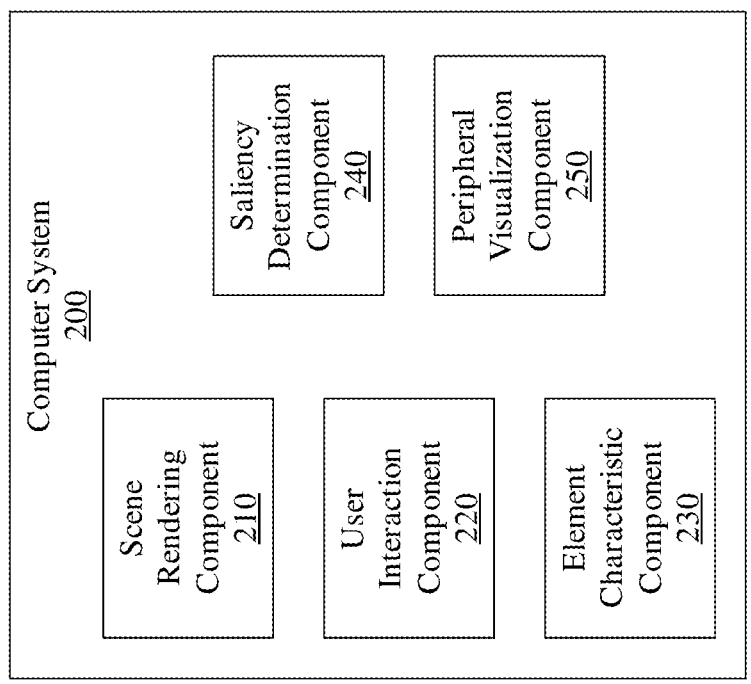
FIG. 2 illustrates an exemplary computer system that uses a peripheral display in a smart manner.

FIG. 2 illustrates an exemplary computer system 200 that is analogous to the computer system 100 of FIG. 1. As shown in FIG. 2, computer system 200 includes various components. In particular, computer system 200 includes a scene rendering component 210, a user interaction component 220, an element characteristic component 230, a saliency determination component 240, and a peripheral visualization component 250.

With these various components, the computer system 200 is capable of selectively rendering a peripheral visualization based on various attributes that are associated with a computer-generated scene. Additionally or alternatively, the computer system 200 is able to selectively render a peripheral visualization based at least in part on one or more detected user movements. Further detail of the computer system 200's various characteristics will be described with respect to the remaining figures.

Figure 3:
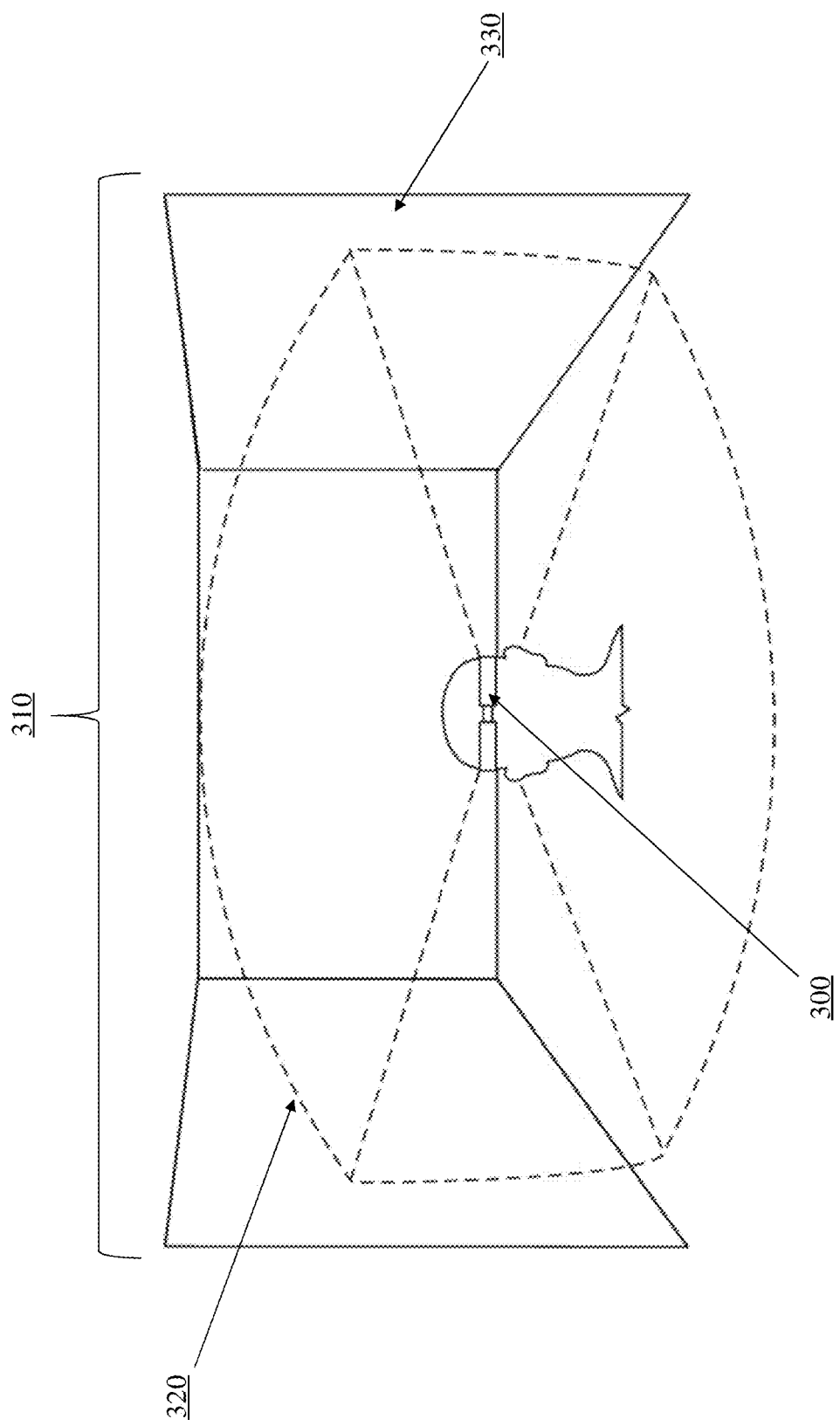
FIG. 3 illustrates an abstract view of a scene that can be rendered by a HMD.

For example, FIG. 3 illustrates a HMD 300 that is visualizing a scene 310 within a primary display of the HMD 300. The HMD 300 is part of a head mounted device similar to the computer system 200 of FIG. 2.

The HMD 300 has a progressive resolution display, meaning the HMD 300 has either 1) a primary display and one or more lower resolution peripheral displays or 2) a wrap-around single display that provides high resolution content in one area and lower resolution content in other areas. These types of displays will be discussed more fully in relation to later figures. Nevertheless, the primary display presents the scene 310 according to a limited field of view 320 (i.e. because of the primary display's limited viewing space or "realty," only a portion of the entire scene is viewable within the primary display). While the primary display visualizes only the limited field of view 320, the scene 310 actually includes additional content. For example, the scene 310 might include active content in an area (e.g., area 330) that is outside of the primary display's limited field of view 320.

While FIG. 3 illustrated an abstract scene 310, FIG. 4 illustrates a more realistic scene example. In particular, FIG. 4 illustrates a primary display 400 that is rendering a scene 410. As shown, scene 410 includes a plurality of elements which will be introduced shortly. The primary display 400 shows the scene 410 according to a limited field of view 420, which is analogous to the limited field of view 320 in FIG. 3. As mentioned above, scene 410 includes a plurality of elements. To elaborate, scene 410 includes a mountainous landscape element 430A, a tree element 430B, and a road element 430C. Although scene 410 is depicted as having three elements, the embodiments presented herein are not limited to merely that number. Instead, the embodiments are able to support any number of elements.

Here, it is worthwhile to note that the elements (e.g., the mountainous landscape element 430A, the tree element 430B, and the road element 430C) of scene 410 may be actual objects in the real world and/or virtual objects. If the scene 410 were part of an augmented-reality scene, then some of the elements in the scene 410 may be actual real-world objects (e.g., the mountainous landscape element 430A may be real mountains in the user's real environment while the tree element 430B may be a virtual object created by the scene and placed with the mountainous landscape element 430A). In contrast, if the scene 410 were part of a virtual-reality scene, then all of the elements would be virtual elements. Accordingly, the present embodiments support the application, or rather the use, of both virtual and real-world elements.

Additionally, the scene 410 might include other elements that are not visibly present in the primary display's limited field of view 420. For example, if the user were to change position or orientation, other elements may become visible in the primary display's limited field of view 420. By way of example and not limitation, if the user were to move her head in an upward motion, birds in the sky may become visible. Alternatively, if the user were to move her head to the left, additional mountains of the mountainous landscape element 430A may become visible. Therefore, although the primary display's limited field of view 420 currently displays only a limited number of elements, the scenes that are rendered by the present embodiments are not so limited.

Similar to FIG. 4, FIG. 5 also presents a primary display 500. This primary display 500 is being used to render a scene 510 within the primary display's limited field of view 520. In addition to the various other elements that were portrayed in FIG. 4, scene 510 also includes an arm 530. The arm 530 is considered an "edge" element because it is displayed at an edge region of the primary display's limited field of view 520. In this current user pose, only the arm 530 is visible in the primary display's limited field of view 520. However, if the user were to move her head to the right, the primary display's limited field of view 520 would show additional content related to the arm 530 (e.g., the arm 530 belongs to a person who has a head, torso, legs, etc.). Stated differently, because the user is situated in this current pose, only the arm 530 is visible in the primary display's limited field of view 520. As a result, FIG. 5 clearly shows that while various elements may be rendered in the primary display's limited field of view 520, the scene 510 may include additional elements that may become visible when/if the user changes her pose or position.

Figure 6:
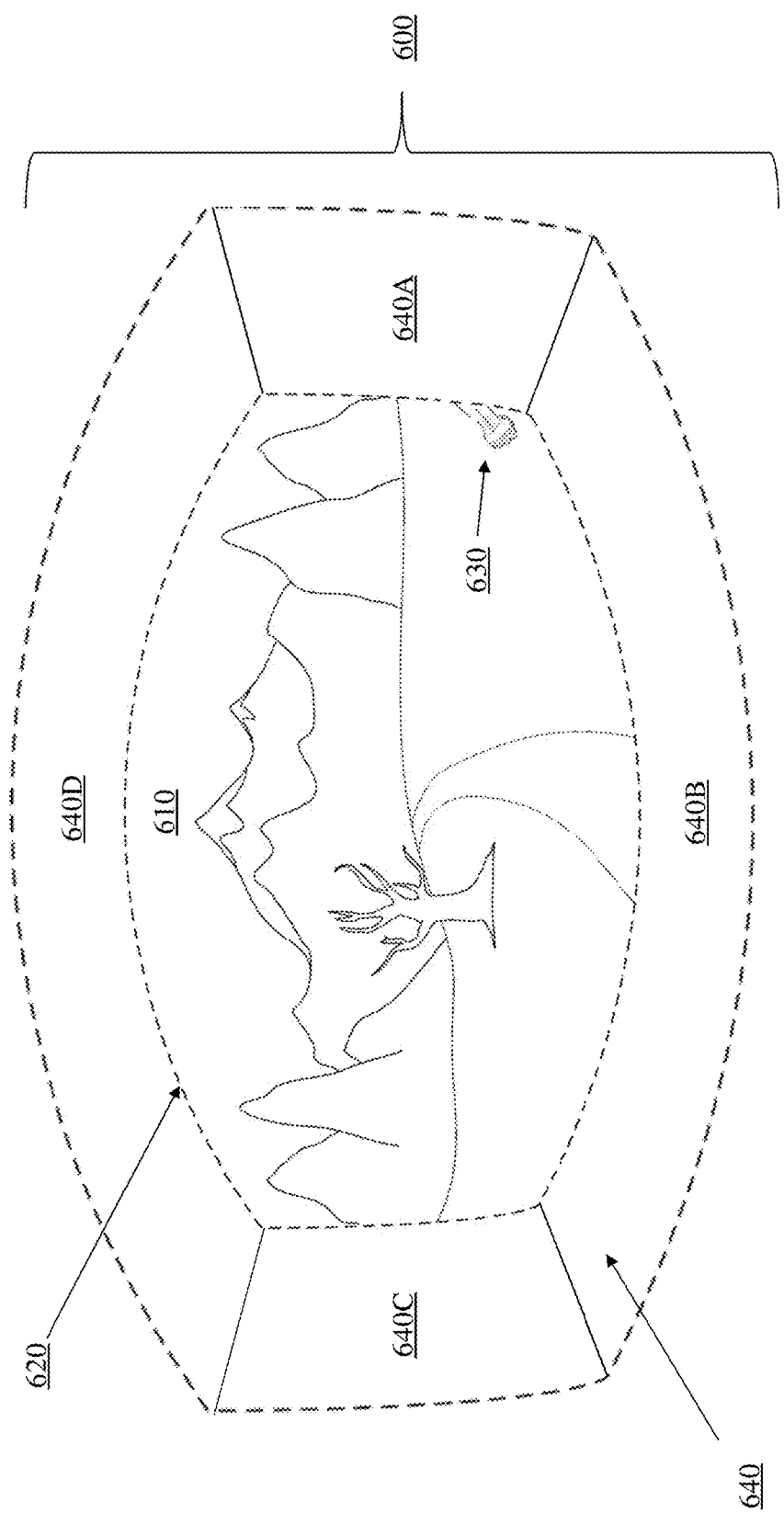
FIG. 6 illustrates some of the various components of a HMD, including the primary display and various peripheral displays.

Up to now, the figures have focused on what is viewable in a primary display of a HMD. FIG. 6 will now be used to discuss both a primary display and various peripheral displays of a HMD.

In particular, FIG. 6 illustrates a HMD 600. This HMD 600 is being used to render a scene 610 within a primary display's limited field of view 620. Similar to scene 510 of FIG. 5, scene 610 also has various elements, including an arm 630. In contrast to the previous figures, however, FIG. 6 now illustrates a plurality of peripheral displays 640 (e.g., peripheral displays 640A, 640B, 640C, and 640D).

The peripheral displays 640 are comprised of one or more low-resolution pixels (not individually shown) that are located around an outer perimeter of the primary display. The peripheral displays 640 can include any number of pixels in which the pixel density is less than the pixel density of the primary displays. In some instances, the embodiments of this disclosure are also applied to 'non-sparse' displays where the pixel density is equivalent across the FOV and in which the primary display is a first portion of the FOV and the secondary display is a discrete/separate portion of the FOV. As discussed earlier, a pixel refers to any light emitting source (e.g., an LED). While these low-resolution pixels are normally set to a default "off" configuration, at certain triggering instances, one or more of them will emit light. As a result, instead of facing 1) a pitch-black region around the primary display (in the case of a virtual-reality system) or 2) no virtual content (in the case of an augmented-reality system), the computer system provides additional (albeit minor) content/context for the user, which content/context is displayed outside of the primary display.

When triggered, one or more low-resolution pixels of one or more of the peripheral displays 640 will emit light. In some embodiments, this triggering action occurs in connection with certain elements or events that are associated with the scene 610. For example, because the arm 630 is displayed as being near an edge region of the primary display's limited field of view 620, the present embodiments are able to determine whether one or more pixels of one or more peripheral displays 640 should emit light to reflect the fact that there is additional scene content that is not presently viewable in the primary display's limited field of view 620.

Here, an example will be helpful. Suppose the scene 610 is actually a combat scene such that the user is immersed in a fighting situation. Further, suppose the arm 630 is associated with an enemy of the user (i.e. the arm 630 is the enemy's arm). In some situations, the user might not be aware that an enemy will soon attack her flank. For example, the user's attention, or rather "center of focus," might be focused on some other area of the primary display's limited field of view 620. As a result, the user might not be aware of the enemy's presence. In order to draw attention to the enemy, based on a determination that the enemy is salient and/or based on the relative movement of the enemy, the disclosed embodiments may cause one or more pixels of one or more of the peripheral displays 640 to dynamically/selectively light up (e.g., the embodiments may cause one or more pixels in peripheral display 640A to emit light). This lighting-up action can be used to notify the user that there is content (i.e. the enemy) near a peripheral region of the primary display's limited field of view 620. Accordingly, the embodiments can use the peripheral displays 640 to make a user aware that there is additional scene content that is either 1) not immediately viewable (e.g., the content is outside of the primary display's limited field of view 620) or 2) only partially viewable on the primary display's limited field of view 620.

As discussed, the peripheral displays 640 may each be comprised of one or more pixels. In some instances, a peripheral display (e.g., peripheral display 640A) may comprise many pixels (but still less than the high-resolution primary display). In these situations, the large number of pixels available to the peripheral display may be used to illuminate a generalized outline of an object (e.g., illuminate a generalized outline of the person whose arm is depicted in scene 610). Additionally, these pixels may emit light in a color that is generally related to the element being depicted by the peripheral display (e.g., if a person is wearing green, a pixelated outline of the person may be generated in various colors to generally match the person, including a green color).

Other embodiments support much "sparser" peripheral displays. Here, these sparse displays comprise fewer pixels such that no discernable shape or contour is able to be visualized using the pixels. Instead, these pixels provide only a very generalized context or acknowledgement that something is in the peripheral region (e.g., instead of generating an outline as above, perhaps only a single large pixel is illuminated in green to reflect the presence of the person in the scene). Accordingly, the embodiments support a wide variety in how many pixels are included within a peripheral display.

In some embodiments, each of the various different peripheral displays (e.g., peripheral displays 640A-640D) have a different number of pixels. To clarify, the number of pixels of peripheral display 640A may be different than the number of pixels in peripheral display 640D. Therefore, as indicated earlier, the embodiments of the present invention support a wide variety in how their peripheral displays are configured and oriented in relation to a primary display.

Figure 7:
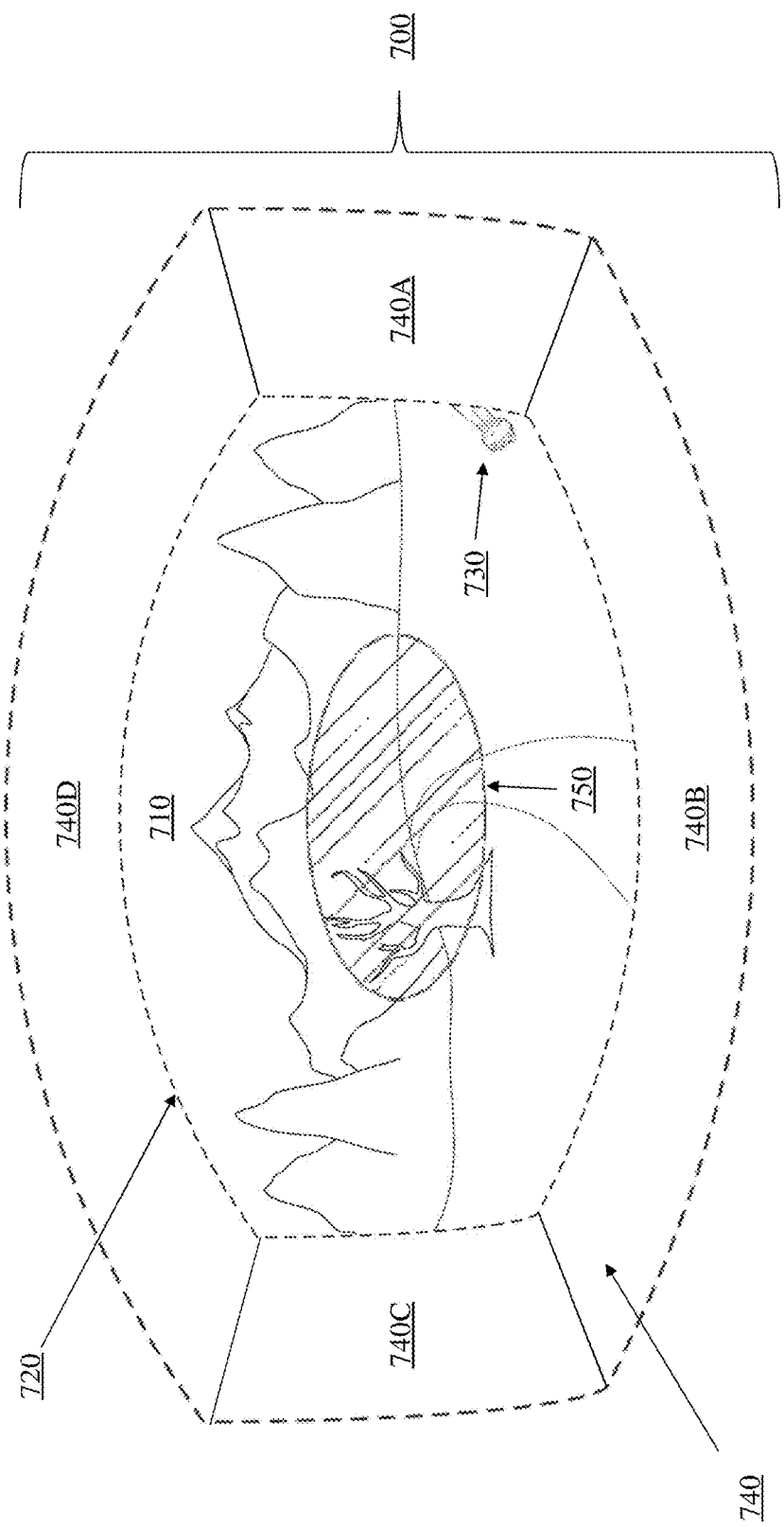
FIG. 7 illustrates a user's center of focus as it relates to a scene.

FIG. 7 further expounds on the preceding discussion. Indeed, similar to FIG. 6, FIG. 7 also shows a HMD 700 that is being used to render a scene 710 within a primary display's limited field of view 720. Scene 710 includes a plurality of elements, including an arm 730. Further, the HMD 700 also includes a plurality of peripheral displays 740 (e.g., peripheral displays 740A, 740B, 740C, and 740D). In contrast to the previous figures, however, FIG. 7 now depicts a user's center of focus 750 (i.e. the point/area that has captured the user's attention).

Various methods are available to determine the user's center of focus 750. Indeed, some embodiments utilize eye tracking technology to track a fovea of one or more of the user's eyes. To accomplish that, the eye tracking technology tracks the various eye movements of the user wearing the HMD 700. Using this eye tracking technology, these embodiments determine where the user's center of focus 750 is located. As will be discussed later, however, other embodiments are able to use additional techniques for determining where the user's center of focus 750 is located.

Up to now, the discussion has largely been focused on the general use of a peripheral display. Now, the discussion will focus on how the embodiments effectively use a peripheral display in a "smart" manner.

"Smart" Use of Peripheral Displays Based on Saliency

As briefly discussed earlier, the conventional peripheral display technology fails to utilize peripheral displays in a "smart" manner. For instance, conventional HMDs cause peripheral displays to 1) perpetually emit light, 2) emit light at inappropriate instances, 3) fail to learn from past user behavior, etc. Because of these failures, users of the conventional technology may experience discomfort, and the actual HMD hardware also faces operational burdens (e.g., shortened battery life). In contrast to the conventional technology, the present embodiments are able to learn and adapt to user behavior to thereby provide a "smart" use of their peripheral displays.

In some disclosed embodiments, a peripheral display is initially configured to be in a default "off" configuration and to activate and emit light, dynamically/selectively, only when a detected element near/proximate the peripheral display is determined to be "salient." The embodiments determine saliency based on a variety of factors. For example, some embodiments determine saliency based on events occurring in a scene while other embodiments base saliency on certain user actions.

Figure 8:
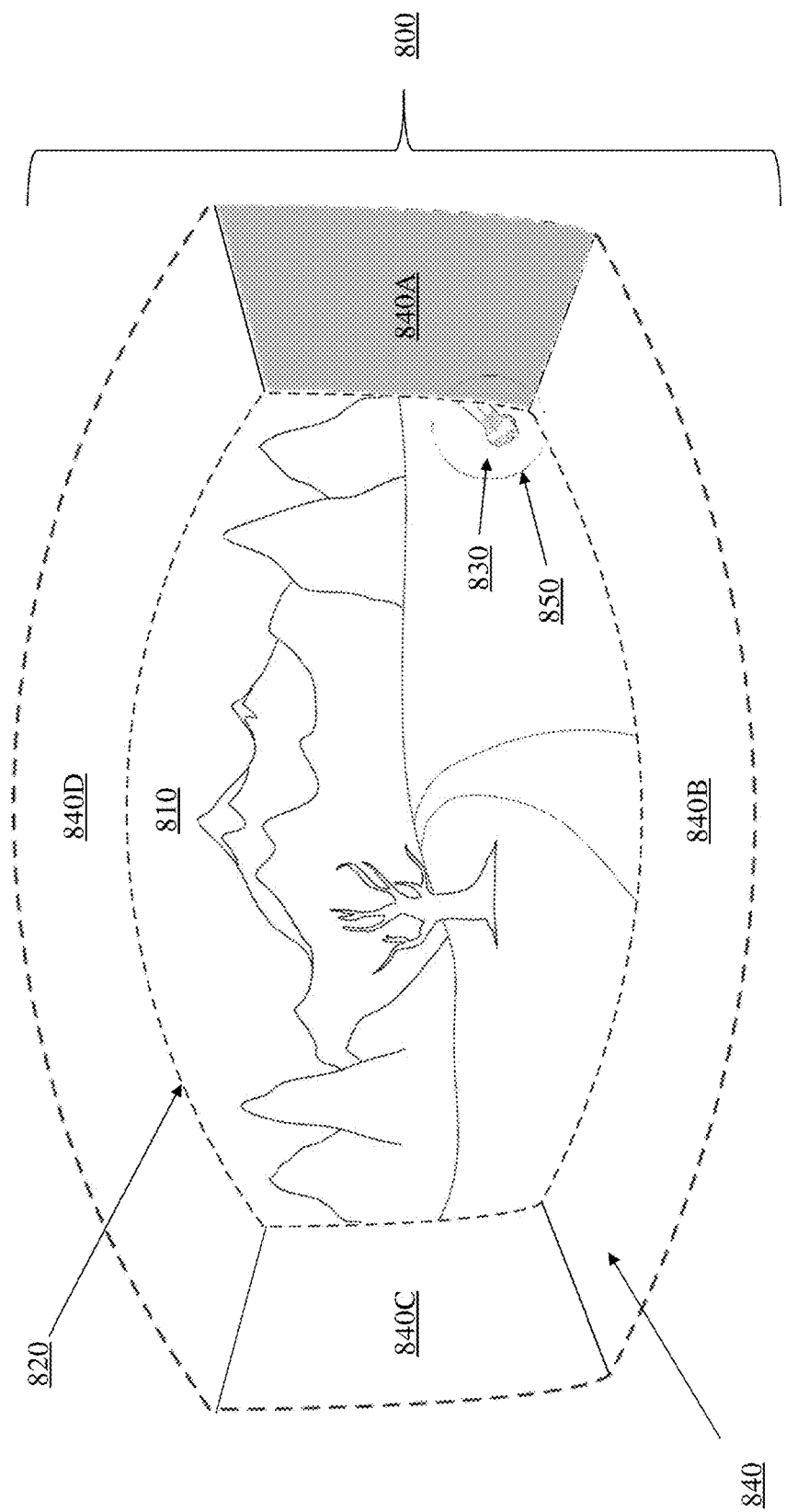
FIG. 8 illustrates a peripheral display that emits light in response to a salient element.

To illustrate, FIG. 8 shows a HMD 800 that is being used to render a scene 810 within a primary display's limited field of view 820. This scene includes a plurality of elements, including an arm 830. Further, the HMD 800 includes peripheral displays 840 (e.g., peripheral displays 840A, 840B, 840C, and 840D). FIG. 8 also depicts the user's center of focus 850.

Here, FIG. 8 shows that one or more pixels of the peripheral display 840A are illuminated. FIG. 8 also shows that the user's attention 850 is focused on the arm 830. As will be discussed next, the pixels of peripheral displays 840 can be illuminated based on a variety of factors.

For instance, some embodiments will attempt to redirect a user's center of focus 850. Using FIG. 8 as an example, suppose the user's center of focus 850 was originally directed to an element that was not the arm 830. Further, suppose the arm 830 belongs to an enemy as was generally discussed in the combat example from above. In this situation, it may be beneficial to cause the user to redirect her center of focus 850 so that it is now focused on the arm 830.

To that end, some embodiments will cause one or more pixels of the peripheral displays 840 (e.g., peripheral display 840A) to illuminate so as to highlight the fact that the enemy may soon attack the user's flank. By lighting up at least a part of the peripheral display 840A, the user's center of focus 850 will be redirected to the arm 830. As a result, these embodiments attempt to redirect a user's center of focus 850 to important, or rather salient, regions/elements.

Other embodiments use different determinations for deciding when the peripheral displays 840 should be illuminated. For example, the user's center of focus 850 can actually force an element to become salient. To clarify, an element may become salient when that element is particularly noticed by the user. This process can occur through various actions. To elaborate, an element can become salient if it moves, appears, or disappears from a scene and thereby draws the user's center of focus 850 to that element. Further, an element can become salient if it is interactive in some way (e.g., an enemy that the user can fight, a navigation button that is selectable, etc.). Relative movement of an element proximate an edge of the peripheral display, based on actual movement of the element and/or movement of the HMD, can trigger a determination that the element is salient and the corresponding activation of the peripheral display. As a result, a user, through her actions and/or center of focus modules, can force an element to become salient.

The element can also become salient upon determining that it is unique when compared with a surrounding scene region. In this context, an element is salient if its luminance, shape, color, or texture is sufficiently different from other content that is proximate to that element in the scene. If the element portrays these characteristics, then the element is considered salient, and the peripheral displays 840 may emit light in the manner described previously (e.g., in situations where the element is an edge element). By way of example and not limitation, suppose a scene is being rendered that includes a large green grassland. Further, suppose a virtual person who is wearing pink is rendered within a central area of this large green grassland. Embodiments of the present invention are able to determine that this pink-clad virtual person is salient because of that person's stark difference in visual appearance as compared with the large green grassland. Therefore, the present embodiments are able to determine whether an element is sufficiently different by analyzing luminance, shape, color, and/or texture of an element and determining whether those characteristics meet a saliency threshold. If so, then that element will be considered salient.

As a result, some embodiments will illuminate the peripheral displays 840 in response to user actions (e.g., the user looks at the arm 850 which is located at a peripheral area of the scene). The peripheral displays 840 will then emit light in accordance with the element that drew the user's center of focus 850. Although FIG. 8 shows an entire region of the peripheral display 840A as being illuminated, the embodiments can cause only portions (i.e. various pixels) of the peripheral display 840A to emit light in the manner described earlier (e.g., a generalized outline or merely a sparse contextual notification).

The disclosed embodiments will trigger the activation of the peripheral display(s) proximate a salient element, regardless of the scheme or mechanism the used. In some instances, the salient element must intersect the edge of the peripheral display(s) being activated. In other instances, the salient element only needs to be within a predetermined proximity to the edge of the peripheral display(s). Once activated, the peripheral displays will emit light to correspond with that element's saliency. In some instances, the intensity and/or color of the peripheral display(s) will also correspond with the determined saliency of the element. For instance, a more salient element will trigger a greater intensity of light from the peripheral display than a less salient element.

Figure 9:
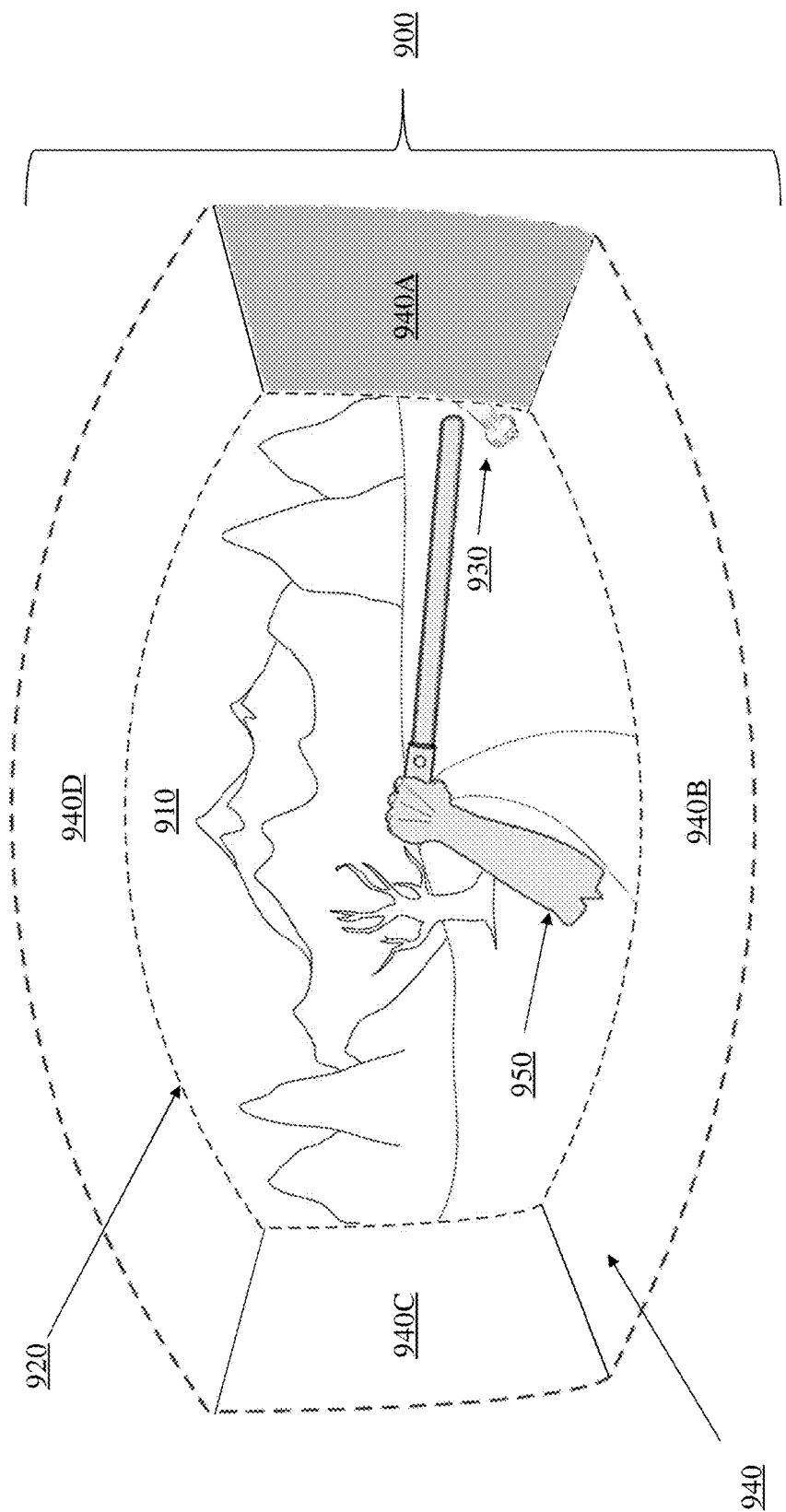
FIG. 9 illustrates another peripheral display that is emitting light in response to a salient element.

Although the previous discussion focused on peripheral displays that emit light based on user actions, the present embodiments are also able to cause peripheral displays to emit light for other reasons. For example, FIG. 9 shows a HMD 900 that is being used to render a scene 910 within a primary display's limited field of view 920. Scene 910 includes a plurality of elements, including an arm 930. The HMD 900 also includes peripheral displays 940 (e.g., peripheral displays 940A, 940B, 940C, and 940D). Here, however, the scene 910 includes a visualization of the current user's arm 950 holding a sword. This sword can be a virtual element or it can be an actual, real-world sword.

FIG. 9 shows that at least a part of the peripheral display 940A is emitting light. Whereas some embodiments cause a peripheral display to emit light based on the user's center of focus as it is determined by eye movement, other embodiments determine where the user's center of focus is located by analyzing other attributes of the scene 910. For example, FIG. 9 shows that the user's arm 950 is attempting to attack the arm 930 with a sword. Here, instead of using eye movement to determine that the user's attention is focused on the arm 930, these embodiments determine that the user's center of focus is located on the arm 930 based on other kinds of user action (e.g., the user's attacking movements). In response to determining that the user's center of focus is on the arm 930 based on the attacking actions, these embodiments cause at least a portion of the peripheral display 940A to emit light corresponding to the edge element (i.e. the arm 930). Accordingly, the present embodiments are able to use a variety of factors in determining where the user's center of focus is located and can use these factors to determine when and how a peripheral display is to emit light when an edge element is present.

Figure 10:
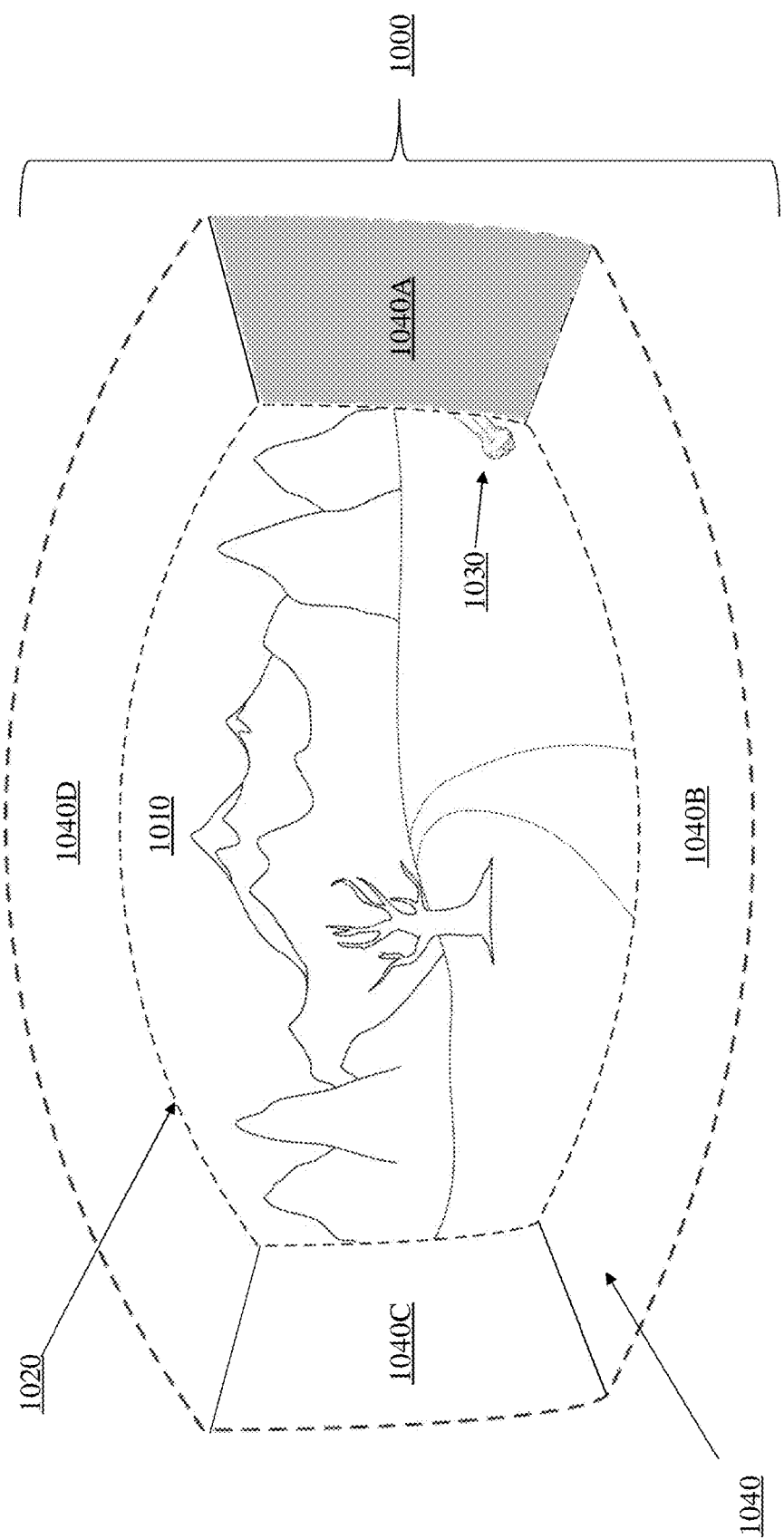
FIG. 10 illustrates that an element may be characterized as salient based on other attributes of that element.

Now, the discussion will focus on ways to determine saliency based on element attributes. In particular, FIG. 10 shows a HMD 1000 that is being used to render a scene 1010 within a primary display's limited field of view 1020. Scene 1010 includes a plurality of elements, including an arm 1030. The HMD 1000 also includes one or more peripheral displays 1040 (e.g., peripheral displays 1040A, 1040B, 1040C, and 1040D).

In scene 1010, the arm 1030 is determined to be salient because it is leaving the primary display's limited field of view 1020. Because the arm 1030 is leaving the primary display's limited field of view 1020, intersecting with a peripheral display edge, some embodiments will determine that the arm 1030 is salient and will cause one or more pixels of one or more of the peripheral displays 1040 (e.g., peripheral display 1040A) to emit light. Accordingly, some embodiments illuminate peripheral displays based on characteristics of the elements themselves (e.g., whether the edge element is moving, appearing, disappearing, etc.) and/or based on proximity/intersection of the element with the edge of the peripheral display.

Figure 11:
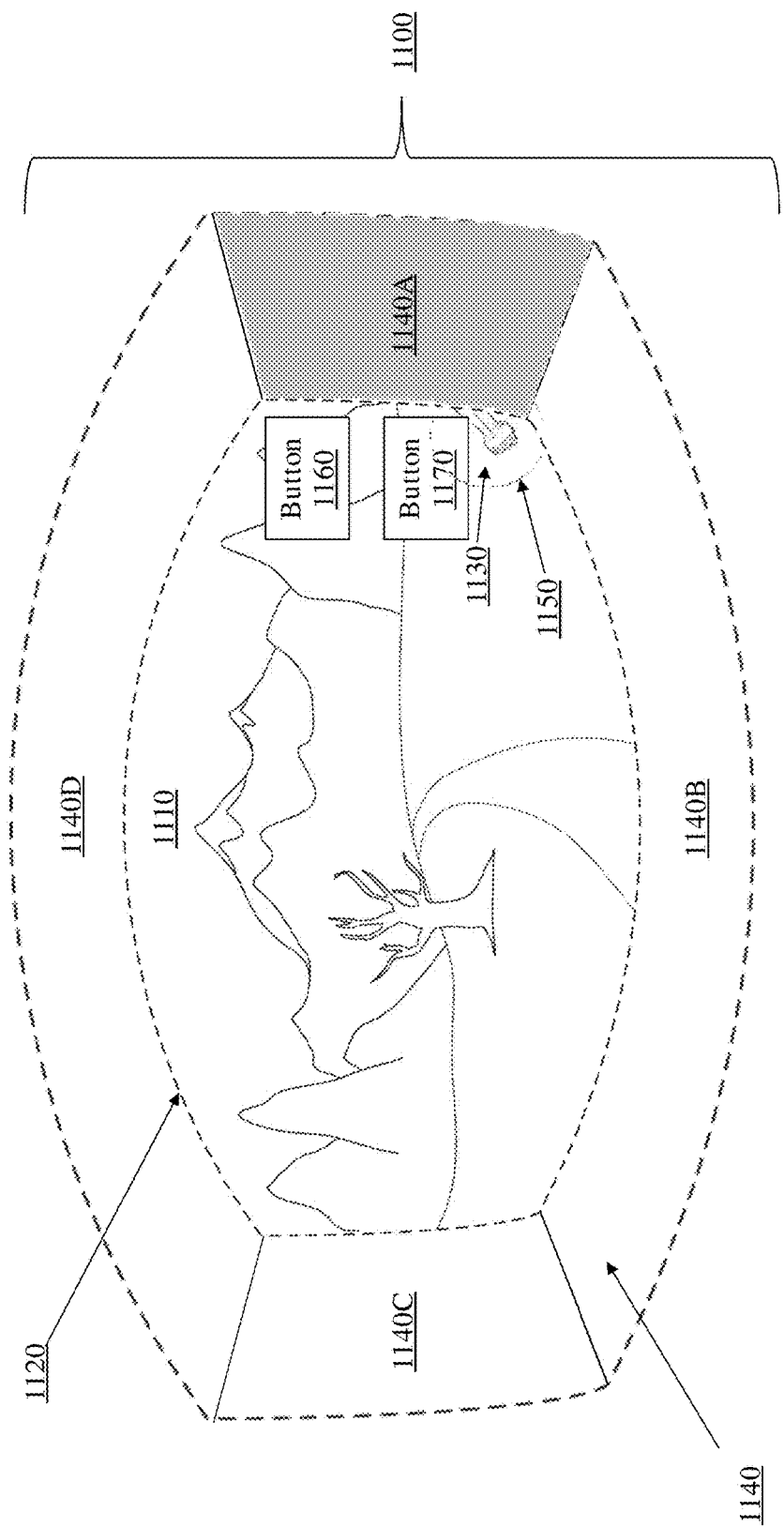
FIG. 11 shows that a peripheral display can emit light for a salient element even when that salient element is partially obstructed by other virtual elements.

In some instances, a scene element will be partially obfuscated, or occluded, by one or more other elements. For example, FIG. 11 presents a HMD 1100 that is being used to render a scene 1110 within a primary display's limited field of view 1120. Scene 1110 includes a plurality of elements, including an arm 1130. The HMD 1100 also includes peripheral displays 1140 (e.g., peripheral displays 1140A, 1140B, 1140C, and 1140D). FIG. 11 also shows the user's center of focus 1150, and two virtual buttons, button 1160 and button 1170. Button 1170 is partially occluding another element (i.e. the arm 1130). As further shown in FIG. 11, the user's center of focus 1150 is directed to the arm 1130.

Some embodiments will cause at least a portion of the peripheral display 1140A to emit light even when it is unclear as to whether the user's center of focus 1150 is focused on a virtual button (e.g., button 1170) or an edge element (e.g., the arm 1130).

Figure 12:
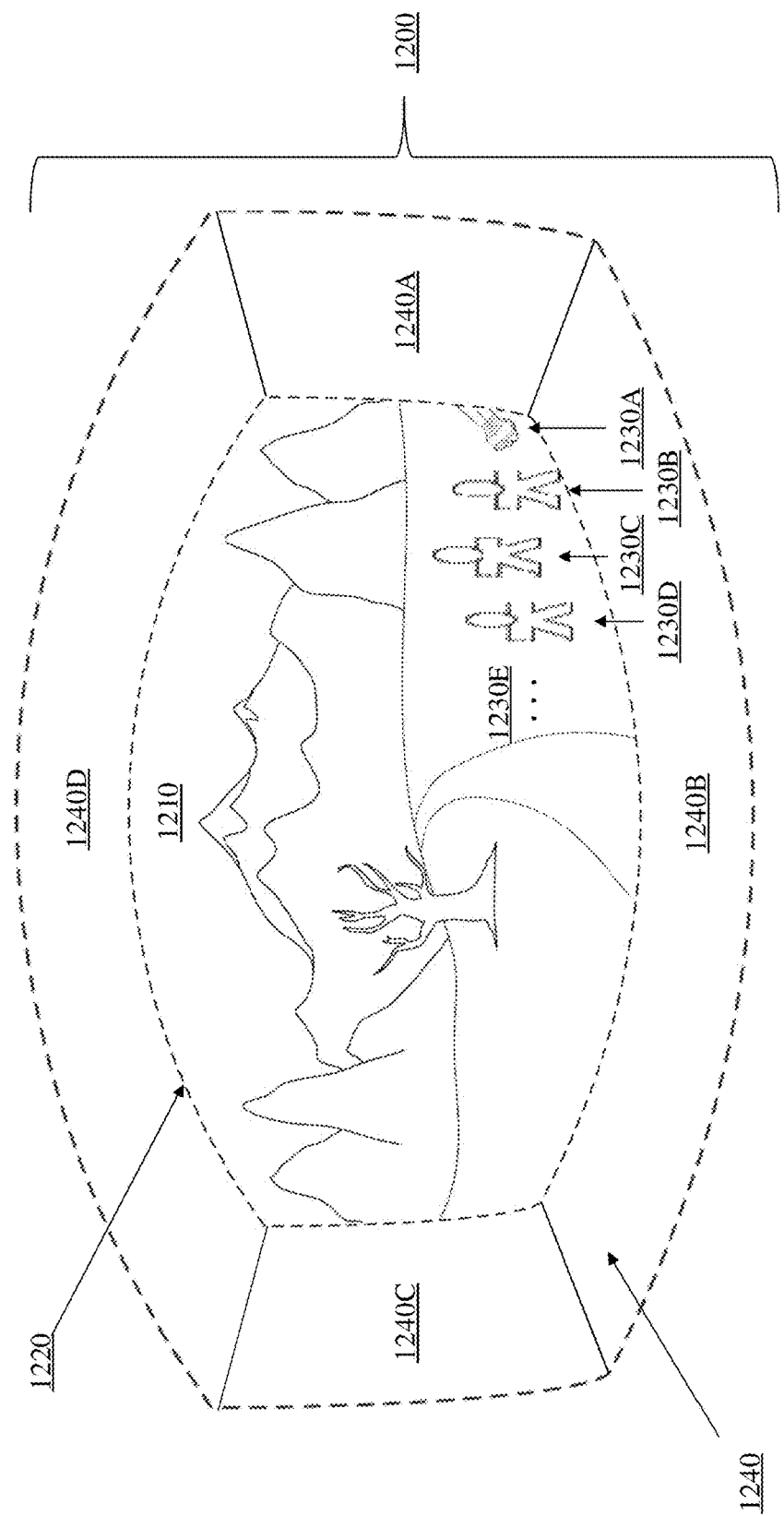
FIG. 12 illustrates that elements in a scene may introduce saliency noise.

Saliency can also be dynamically determined based on other attributes of the mixed-reality environment. By way of example, FIG. 12 illustrates a HMD 1200 that is being used to render a scene 1210 within a primary display's limited field of view 1220. Scene 1210 includes multiple scene elements (e.g., an arm 1230A, and multiple people 1230B, 1230C, and 1230D). Although four elements are labeled in FIG. 12, the ellipses 1230E demonstrates that there can be any number of elements in the scene 1210. HMD 1200 also includes peripheral displays 1240 (e.g., peripheral displays 1240A, 1240B, 1240C, and 1240D).

When determining whether a particular element is salient, some embodiments factor in the characteristics of other surrounding, or proximate, elements. For example, FIG. 12 shows that the people 1230B-1230D are proximate to the arm 1230A. If these people 1230B-1230D were moving (i.e. introducing noise into the scene 1210), then the embodiments are able to determine that the relevance, or saliency, of the arm 1230A is not as high as if 1) the arm 1230A were presented in the scene 1210 by itself or 2) the arm 1230A were isolated from those other elements. Stated differently, the saliency "noise" introduced by the people 1230B-1230D can lessen, or otherwise influence, the determined saliency of the arm 1230A.

The situation described above might not always be applicable in every scene. For example, continuing with the combat example from above, some embodiments will determine that the arm 1230A is salient even in the presence of the salience noise introduced by the people 1230B-1230D. To illustrate, suppose the people 1230B-1230D are members of the user's team. However, suppose the arm element 1230A belongs to an enemy fighter. As a result, these embodiments will determine that the arm element 1230A is salient (even though it is near other elements) because it belongs to an enemy of the user. Therefore, these embodiments are able to illuminate at least a portion of one or more of the peripheral displays 1240 (e.g., peripheral display 1240A) to call attention to the salient arm 1230A based on certain identified relationships between the user and the elements. Accordingly, some embodiments determine saliency in a dynamic manner based on the scene and/or element attributes.

As discussed, the embodiments provide salience-based rendering using a peripheral display. To quickly summarize, the embodiments process a virtual scene (e.g., a mixed-, augmented-, or virtual-reality scene) to identify salient regions or elements within the scene. This process includes identifying actual or virtual elements that move, appear, or disappear from the scene. Further, this process includes identifying elements that are sufficiently high in contrast or that are sufficiently unique/isolated within a particular visual field. Even further, user actions can also be used to force an element to become salient.

The embodiments are able to use multiple processes for determining saliency. To illustrate, some embodiments selectively render a peripheral visualization based on various attributes associated with a computer-generated scene (e.g., an element is leaving the primary display's limited field of view). Other embodiments selectively render a peripheral visualization based on a detected movement of the user of the computer system (e.g., the user's center of focus is directed to a particular element).

In an effort to provide further clarity on the various embodiments, some exemplary methods will now be introduced. The computer system 200, with its various components, is capable of performing these methods to use the peripheral display in a "smart" manner. Accordingly, the following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Selective Rendering of Sparse Peripheral Displays Based on Element Saliency

Figure 13:
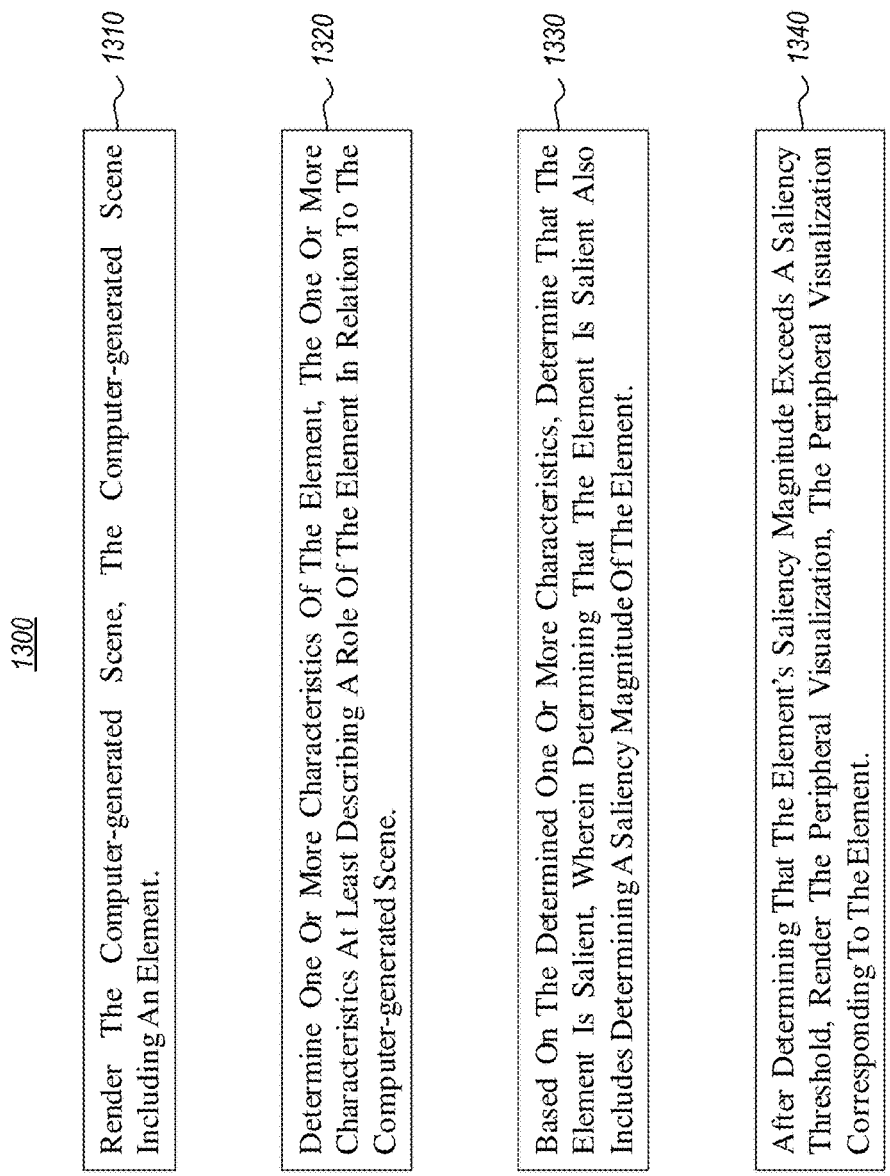
FIG. 13 illustrates an exemplary method for using a peripheral display in a smart manner.

FIG. 13 illustrates an exemplary method 1300 that is performed by a computer system, such as the computer system 200 of FIG. 2. The computer system includes a main display within which a computer-generated scene is rendered and a sparse peripheral display. This sparse peripheral display is disposed around an outer perimeter of the main display. In some embodiments, this sparse peripheral display is comprised of one or more light-emitting diodes (LEDs). Further, this sparse peripheral display is used to render a peripheral visualization. In some embodiments, however, instead of using a completely separate display as the sparse peripheral display, these embodiments include a wrap-around foveated single display within which the computer-generated scene is displayed. These types of wrap-around displays render content in high resolutions near a central area of the display and render content in progressively lower resolutions nearer the outer perimeters of the wrap-around display.

As shown in FIG. 13, method 1300 includes an act (act 1310) of rendering a computer-generated scene. As discussed above, this scene includes one or more elements. These elements can be real-world elements and/or virtual elements. Here, the scene rendering component 210 of FIG. 2 renders the scene according to the principles described earlier. Although any type of element can be used, the process of rendering a peripheral visualization is primarily used for an "edge" element. To clarify, although any type of element may be used, the following discussion is primarily used for "edge" elements. However, this does not mean that the element must, in all instances, intersect with an edge of a peripheral display. Instead, the element is simply nearest the edge of one or more peripheral displays. The peripheral display(s) determined to be nearest the salient element(s) will then be activated based on the salience.

Method 1300 also includes an act (act 1320) of determining one or more characteristics of an element. These characteristics at least describe a role of the element in relation to the scene. By way of example, the role of the element in relation to the computer-generated scene includes an appearance event, a motion event, a disappearance event, an interactive event, or any other type of event that the element may have in relation to the scene. Further, these characteristics include determinations of the element's color, transparency, and contrast as it relates to other, proximate portions and/or elements of the scene. Even further, the characteristics include relative position information, such as determinations as to whether the element is an edge/peripheral element, meaning that the element is located near one or more edge regions of the primary display's limited field of view. Here, the element characteristic component 230 and the user interaction component 220 of computer system 200 either work in tandem or individually to perform this act.

Additionally, the characteristics include determinations regarding the element's size. After the size of the element is determined, the embodiments then translate this size to an angular space for rendering. In other words, the embodiments determine how many pixels of a peripheral display will be needed to properly render the context of the element. Once this determination is made, then the embodiments can cause a commensurate number of pixels to emit light. Further, if the peripheral display supports a sufficient number of pixels, then the embodiments can cause those pixels to illuminate in such a manner so as to depict a generalized shape or outline of the element. Therefore, how the peripheral visualization is rendered on the peripheral display is based on one or more of 1) the translated angular space of the element, 2) a color of the element, or 3) one or more parameters of an event that is associated with the element (e.g., the element is appearing, moving, or disappearing from the scene). Accordingly, the embodiments determine various attributes of the element and then use those attributes to create a peripheral visualization using one or more pixels of a peripheral display (e.g., rendering the peripheral visualization includes causing at least one LED of a sparse peripheral display to light up according to the color of the element).

Other embodiments determine additional characteristics of the element. For example, these embodiments determine a brightness of the element (in relation to other, proximate elements/regions of the computer-generated scene), a flashing status of the element, and a color content of the element. These characteristics are influential in determining whether the element is, or will become, salient.

Method 1300 is then shown as including an act (act 1330) of determining that the element is salient. This determination is based on the characteristics of the element and/or on the user's actions. Further, this determination also includes determining a saliency magnitude of the element. This act is performed by the saliency determination component 240 of the computer system 200 in FIG. 2 according to the principles described earlier.

The saliency threshold and/or the saliency magnitude is dynamically adjustable based on other content included within the computer-generated scene. For example, FIG. 12 introduced that the saliency of the arm 1230A is influenced by the saliency "noise" of the other, proximate elements (e.g., the people 1230B-1230D). Therefore, saliency can be influenced by various environmental factors and may be a relative measure as compared to the 'saliency' of other elements in the scene.

Other embodiments allow for the saliency threshold to be manually configured. Indeed, a user of the computer system can adjust settings to determine when an element will qualify as being salient. For example, during an initial (or subsequent) configuration of the software program executing the computer-generated scene, the user can adjust one or more saliency threshold factors in order to alter or determine when an element will qualify as being salient.

To elaborate, in some embodiments, the saliency threshold factors are related to how long (e.g., 0.5 seconds or some other time) a user's center of focus needs to be directed to a particular element before that element is considered salient. In other embodiments, the saliency threshold factors are related to how long the user needs to interact with an element before it is considered salient. The saliency threshold factors also relate to proportionality of visible content (e.g., if a sufficient percentage of an edge element is rendered in the primary display's limited field of view, then the edge element is salient). Similar adjustable settings are available for contrast levels, size levels, and interaction levels.

Additional embodiments of the present invention determine saliency based on other factors. For example, some embodiments determine that an element is salient based on one or more of 1) a historical trend of a user using the computer system, 2) a present configuration of the computer system, 3) a determined reaction time of the user, or 4) an eye movement of the user. Notably, the embodiments use the peripheral display in a "smart" manner. By "smart," it is meant that the embodiments are able to learn a user's behavior and respond, or even anticipate, how a user will react in response to a particular situation. To accomplish this objective, the embodiments acquire and analyze historical user data. Some of this data is usable to determine the user's reaction time. Once this reaction time is learned, then the embodiments can adjust the computer-generated scene to provide a more enjoyable experience for the user.

Using the combat example from above, if the user is immersed in the combat scene and the embodiments determine that the user is perpetually too slow in reacting to an enemy's attack, then the embodiments can adjust the scene so that the user can progress through the scene in a more enjoyable manner (e.g., slowing the enemy's attack to correspond with the user's determined reaction time). In view of the user's slow reaction speed, some embodiments will determine that the user will likely not notice that some elements are leaving/entering the primary display's limited field of view. In response to this determination, the embodiments will use the peripheral displays in a smart manner by allowing those displays to remain in the off configuration (perhaps because turning the peripheral display on would serve only as a distraction to a user with such a slow reaction speed). Therefore, the embodiments are able to use historical behavior to better improve a user's experience by using the peripheral displays in a smart manner.

Even further, the embodiments are able to determine whether an element is salient based on one or more operating conditions of one or more hardware components of the computer system. For example, if the computer system uses a battery and the battery is running low, then some embodiments will dynamically adjust the saliency threshold so that not as many elements will be classified as salient. Therefore, the peripheral displays will be used less often, and the battery life will be prolonged.

Method 1300 also includes an act (act 1340) of rendering a peripheral visualization. This act occurs after determining that an element's saliency magnitude exceeds a certain saliency threshold. Here, it is worthwhile to note that the peripheral visualization corresponds in some way with the element (e.g., a generalized outline of a remaining portion of the edge element, a matching color of the edge element, a matching size of the edge element, etc.). This act is performed by the peripheral visualization component 250 of computer system 200. Also, an extent to which the peripheral visualization is rendered will be, in some instances, directly based on the determined saliency of the element(s) proximate the peripheral displays. For instance, peripheral rendering for elements having lower salience levels will be less (e.g., lower light intensity and/or less visible light spectrums) as compared to peripheral rendering for elements having relatively higher salience levels (e.g., high light intensity and/or more visible light spectrums for more salient elements). As a result, the extent of rendering may be proportionately based on the determined saliency magnitude of the element.

The act of rendering the peripheral visualization 1340 may also include determining which peripheral displays and/or displays regions the salient element is nearest and selectively activating the peripheral displays and/or displays regions the salient element is nearest while refraining from activating the peripheral displays and/or displays regions the salient element is determined to be furthest from.

Selective Rendering of Sparse Peripheral Displays Based on User Movements

Figure 14:
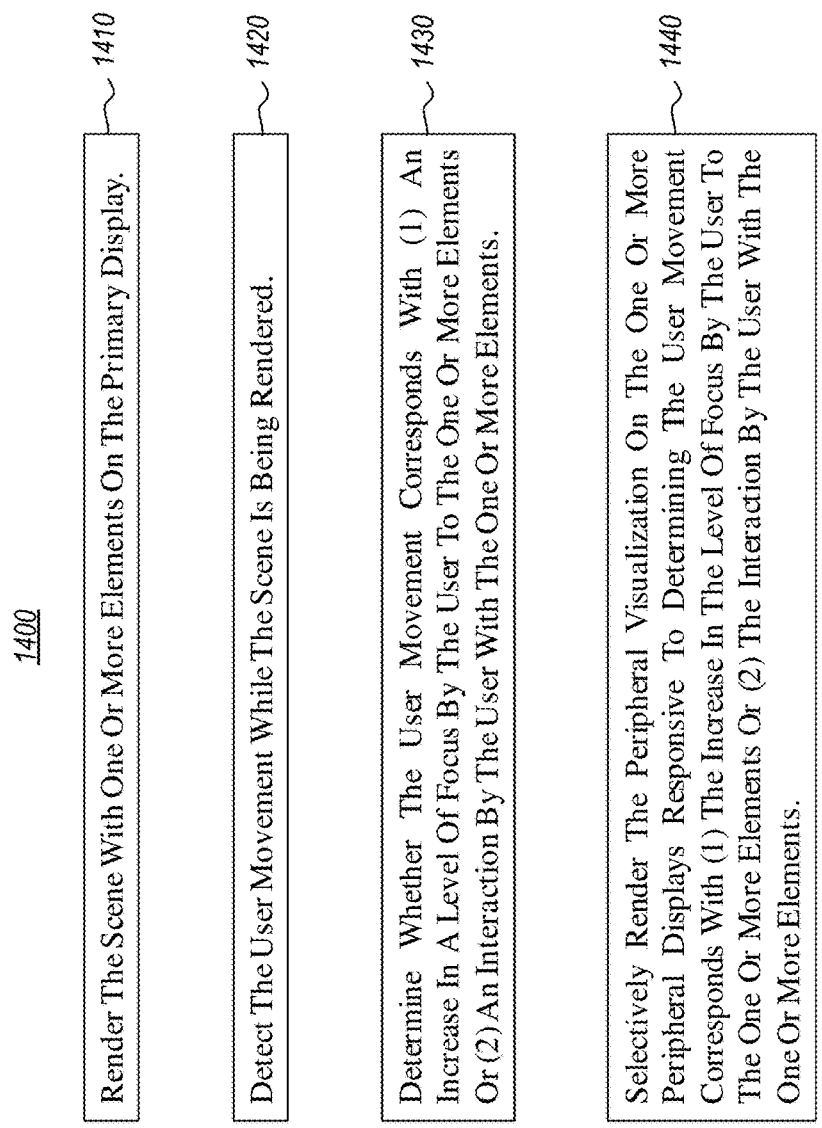
FIG. 14 illustrates another exemplary method in which a peripheral display is used in a smart manner.

FIG. 14 presents an exemplary method 1400 that is also performed on a computer system, such as the computer systems described above. In particular, method 1400 is illustrated as having an act (act 1410) of rendering a scene that includes one or more elements. This scene is rendered on a primary display of the computer system. As discussed earlier, embodiments support one or more peripheral displays that are disposed around an outer perimeter of the primary display. These peripheral displays operate in a default "off" configuration for all pixels until the peripheral visualization is selectively rendered. Here, the scene rendering component 210 of computer system 200 performs this act. Similar to the above disclosure, the process of rendering a peripheral visualization is performed primarily for "edge" elements.

Additionally, some embodiments determine a saliency level for the one or more elements according to the principles described earlier. These saliency levels can be based on a variety of factors. Briefly, some embodiments allow the saliency levels to be influenced based on a context of the element with the scene (e.g., appearing, moving, disappearing, etc.). As a result, the saliency level of the elements is scalable according to environmental noise in the scene according to the principles described earlier in this disclosure. Other embodiments determine saliency level based on the user's historical behavior. This historical behavior is learned by the computer system according to the principles described earlier in this disclosure. Various options are available to learn this historical behavior. For example, some embodiments utilize an environmental understanding camera to learn the user's historical behavior. Other embodiments monitor and record IMU data to learn the user's historical behavior.

As also discussed above, some embodiments allow this saliency level to be influenced by characteristics of other elements that are identified as being proximate to the element in the scene.

Further, some embodiments allow the saliency level to be manually configurable. Additionally, these saliency levels can be calibrated based on a determined reaction time of the user, a determined historical behavior, or even various configuration settings associated with the user.

The method 1400 also includes an act (act 1420) of detecting user movement while the scene is being rendered. This act is performed by the user-interaction component 220 of the computer system 200. Similar to the discussion above, the user movement can be any type of user movement (e.g., an eye movement corresponding to one or more eyes of the user, a hand movement, an arm movement, a leg movement, a head movement, or other type of user gesture).

Method 1400 is then shown as including an act (act 1430) of determining whether the user movement corresponds with 1) an increase in a level of focus by the user to the one or more elements or 2) an interaction by the user with the one or more elements. This act is performed by one or more of the user interaction component 220, the element characteristic component 230, or the saliency determination component 240.

Then, method 1400 is shown as having an act (act 1440) of selectively rendering a peripheral visualization on the one or more peripheral displays in response to determining that the user movement does actually correspond with 1) the increase in the level of focus by the user to the one or more elements or 2) the interaction by the user with the one or more elements. Here, this act is performed by the peripheral visualization component 250 of the computer system 200.

This act of selectively rendering the peripheral visualization on the one or more peripheral displays, in some instances, is further based on determining whether the one or more elements include an element that is salient. This saliency determination is based on one or more characteristics of the elements. As a result, these embodiments refrain from rendering the peripheral visualization until after the element is identified as being salient.

Some embodiments project one or more navigation/operation buttons onto the primary display's limited field of view. When this occurs, the method 1400 can also include an act (not shown) of identifying that the one or more elements are at least partially being occluded by the one or more navigation/operation buttons. Further, the method 1400 can include an act of causing the peripheral visualization to be selectively rendered even though the one or more elements are at least partially occluded, as is generally shown in FIG. 11.

The method 1400 can also include an act of determining one or more characteristics of the one or more elements. These characteristics indicate that the elements are located at an edge region of the scene. Then, the method 1400 includes an act of identifying an area of focus of the user. At this point, the area of focus may not be near the edge region of the scene (e.g., as shown in FIG. 7). Subsequently, the method 1400 includes an act of dynamically altering a relevance/saliency level of the elements to either reduce or increase a relevancy/noticeability of the elements in the scene (e.g., causing the elements to flash, be brighter, larger, etc.). If reduced, then the embodiments are not attempting to redirect/divert the user's focus. However, if increased, then the embodiments are attempting to redirect/divert the user's area of focus.

Also, an extent to which the peripheral visualization is rendered will, in some instances, be based on relative interaction of the user with the elements in the scene, based on relative eye focus of the user (or other detected movements of the user) relative to elements in the scene. For instance, lower levels of user-based element interaction/focus/movement will be associated with less peripheral rendering (e.g., lower light intensity and/or less visible light spectrums) as compared to higher levels of user-based element interaction/focus/movement that are associated with greater levels of rendering (e.g., high light intensity and/or more visible light spectrums). As a result, in some embodiments, the extent of rendering will be directly/proportionally based on the determined user focus, movements and/or interactions of the user with certain elements in the scene.

The act of selectively rendering the peripheral visualization 1440 may also include determining which peripheral displays to activate, based on determining which peripheral displays and/or displays regions are nearest the detected user focus/interactions/movements and then activating those peripheral displays and/or display regions, while refraining from activating the peripheral displays and/or displays regions that are furthest from the elements that are associated with the detected user focus/interactions/movements.

Accordingly, this disclosure enables embodiments that are capable of selectively rendering a peripheral visualization based on various attributes that are associated with a computer-generated scene and salience of the displayed elements in the scene. Further, the embodiments are able to selectively render a peripheral visualization based on one or more detected user movements. Combinations of the foregoing methods and embodiments are also contemplated and included with the scope of this disclosure.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer system comprising:
 a head-mounted display that includes both a primary display and one or more peripheral displays, wherein the one or more peripheral displays include a set of one or more low-resolution light-emitting pixels, and wherein the one or more low-resolution light-emitting pixels have a default configuration of being turned off and are selectively turned on to emit light only upon occurrence of a triggering action;
one or more processors; and
one or more computer-readable hardware storage media having stored thereon computer-executable instructions, the computer-executable instructions being executable by the one or more processors to cause the computer system to selectively render a peripheral visualization with the one or more peripheral displays corresponding to a scene rendered on the primary display based at least in part on a detected movement of a user by causing the computer system to:
render the scene with one or more elements on the primary display;
detect the user movement while the scene is being rendered;
determine whether the user movement is the triggering action by determining whether the user movement corresponds with (1) an increase in a level of focus by the user to the one or more elements or (2) an interaction by the user with the one or more elements; and
selectively trigger at least one of the one or more low-resolution light-emitting pixels to emit light so as to render the peripheral visualization on the one or more peripheral displays responsive to determining the user movement is the triggering action and does correspond with (1) the increase in the level of focus by the user to the one or more elements or (2) the interaction by the user with the one or more elements.

2. The computer system of claim 1, wherein the user movement is an eye movement corresponding to one or more eyes of the user.

3. The computer system of claim 1, wherein the user movement is a head movement of the user.

4. The computer system of claim 1, wherein the interaction by the user includes a gesture of the user.

5. The computer system of claim 1, wherein the peripheral visualization is a generalized outline of a virtual object.

6. The computer system of claim 1, wherein selectively rendering the peripheral visualization on the one or more peripheral displays is further based on determining whether the one or more elements include an element that is determined to be salient, the salient determination being based on one or more characteristics of the element, whereby the computer system refrains from rendering the peripheral visualization until after the element is identified as being salient.

7. The computer system of claim 1, wherein a saliency level of the one or more elements is influenced based on a context associated with the scene such that the saliency level of the one or more elements is scalable according to environmental noise in the scene.

8. One or more hardware storage devices having stored thereon computer-executable instructions, the computer-executable instructions being executable by one or more processors of a computer system to cause the computer system to selectively render a peripheral visualization using one or more peripheral displays corresponding to a scene rendered on a primary display based at least in part on a detected movement of a user by causing the computer system to:
render the scene with one or more elements on the primary display;
detect the user movement while the scene is being rendered;
determine whether the user movement corresponds with (1) an increase in a level of focus by the user to the one or more elements or (2) an interaction by the user with the one or more elements; and
determining one or more characteristics of the one or more elements, the one or more characteristics indicating that the one or more elements are located at an edge region of the scene;
identifying an area of a focus of the user, the area of focus not being near the edge region of the scene;
dynamically altering a saliency level of the one or more elements to thereby reduce a relevancy of the one or more elements in the scene, whereby, by reducing the relevancy of the one or more elements, the user's focus is not diverted from the area of focus; and
selectively render the peripheral visualization on the one or more peripheral displays responsive to determining the user movement corresponds with (1) the increase in the level of focus by the user to the one or more elements or (2) the interaction by the user with the one or more elements.

9. The one or more hardware storage devices of claim 8, wherein the one or more peripheral displays are disposed around an outer perimeter of the primary display, and wherein the one or more peripheral displays operate in a default off configuration for all pixels until the peripheral visualization is selectively rendered.

10. The one or more hardware storage devices of claim 8, wherein execution of the computer-executable instructions further causes the computer system to determine a saliency level of the one or more elements.

11. The one or more hardware storage devices of claim 10, wherein the saliency level is based on a determined historical behavior of the user, the historical behavior being learned by the computer system.

12. The one or more hardware storage devices of claim 11, wherein the computer system includes environmental understanding cameras, and wherein the computer system at least partially uses the environmental understanding cameras to learn the historical behavior of the user.

13. The one or more hardware storage devices of claim 10, wherein the saliency level is influenced by characteristics of other elements that are identified as being proximate to the one or more elements in the scene.

14. The one or more hardware storage devices of claim 10, wherein the saliency level is manually configurable such that the user of the computer system determines the saliency level.

15. The one or more hardware storage devices of claim 10, wherein the computer system calibrates the saliency level based on one or more of 1) a determined reaction time of the user, 2) a determined historical behavior of the user, or 3) a configuration setting associated with the user.

16. A method for selectively rendering a peripheral visualization using one or more peripheral displays corresponding to a scene rendered on a primary display based at least in part on a detected movement of a user, the method being implemented by one or more processors of a computer system, the method comprising:
rendering the scene with one or more elements on the primary display, wherein the scene further includes one or more navigation buttons;
detecting the user movement while the scene is being rendered, wherein the one or more navigation buttons are selectable by the movement of the user;

determining whether the user movement corresponds with (1) an increase in a level of focus by the user to the one or more elements or (2) an interaction by the user with the one or more elements;

identifying that the one or more elements are at least partially being occluded by the one or more navigation buttons; and selectively rendering the peripheral visualization on the one or more peripheral displays responsive to determining the user movement corresponds with (1) the increase in the level of focus by the user to the one or more elements or (2) the interaction by the user with the one or more elements, wherein the peripheral visualization are selectively rendered even though the one or more elements are at least partially occluded.

17. The method of claim 16, wherein the method further includes:

determining one or more characteristics of the one or more elements, the one or more characteristics indicating that the one or more elements are located at an edge region of the scene;

identifying an area of a focus of the user, the area of focus not being near the edge region of the scene; and dynamically altering a saliency level of the one or more elements to thereby reduce a relevancy of the one or more elements in the scene;

whereby, by reducing the relevancy of the one or more elements, the user's focus is not diverted from the area of focus.

18. The method of claim 16, wherein the method further includes:

determining one or more characteristics of the one or more elements, the one or more characteristics indicating that the one or more elements are located at an edge region of the scene;

identifying an area of a focus of the user, the area of focus not being near the edge region of the scene; and dynamically altering a saliency level of the one or more elements to thereby increase a relevancy of the one or more elements in the scene;

whereby, by increasing the relevancy of the one or more elements, the user's focus is diverted from the area of focus.

19. The method of claim 16, wherein selectively rendering the peripheral visualization is also based on one or more identified conditions of one or more hardware components of the computer system.

20. A method for selectively rendering a peripheral visualization using one or more peripheral displays corresponding to a scene rendered on a primary display based at least in part on a detected movement of a user, the method being implemented by one or more processors of a computer system and comprising:

rendering the scene with one or more elements on the primary display;

detecting the user movement while the scene is being rendered;

determining whether the user movement corresponds with (1) an increase in a level of focus by the user to the one or more elements or (2) an interaction by the user with the one or more elements;

determining one or more characteristics of the one or more elements, the one or more characteristics indicating that the one or more elements are located at an edge region of the scene;

identifying an area of a focus of the user, the area of focus not being near the edge region of the scene;

dynamically altering a saliency level of the one or more elements to thereby increase a relevancy of the one or more elements in the scene, whereby, by increasing the relevancy of the one or more elements, the user's focus is diverted from the area of focus; and selectively rendering the peripheral visualization on the one or more peripheral displays responsive to determining the user movement corresponds with (1) the increase in the level of focus by the user to the one or more elements or (2) the interaction by the user with the one or more elements.

* * * * *